United States Patent
Sakamaki et al.

(10) Patent No.: US 10,324,190 B2
(45) Date of Patent: Jun. 18, 2019

(54) WIND MEASURING APPARATUS

(71) Applicant: Mitsubishi Electric Corporation, Chiyoda-ku (JP)

(72) Inventors: Hiroshi Sakamaki, Tokyo (JP); Kenji Komai, Tokyo (JP); Nobuhiro Suzuki, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 15/767,374

(22) PCT Filed: Oct. 23, 2015

(86) PCT No.: PCT/JP2015/080007
§ 371 (c)(1),
(2) Date: Apr. 11, 2018

(87) PCT Pub. No.: WO2017/068728
PCT Pub. Date: Apr. 27, 2017

(65) Prior Publication Data
US 2018/0299558 A1  Oct. 18, 2018

(51) Int. Cl.
*G01S 17/95* (2006.01)
*G01W 1/00* (2006.01)
(Continued)

(52) U.S. Cl.
CPC .............. *G01S 17/95* (2013.01); *G01S 13/95* (2013.01); *G01S 17/023* (2013.01); *G01S 17/58* (2013.01);
(Continued)

(58) Field of Classification Search
CPC .................................. G01S 17/58; G01P 5/26
See application file for complete search history.

(56) References Cited

U.S. PATENT DOCUMENTS 4,483,614 A * 11/1984 Rogers ...................... G01P 5/26
250/461.1
7,311,000 B2   12/2007 Smith et al.
(Continued)

FOREIGN PATENT DOCUMENTS

EP    2 269 078 B1   3/2013
EP    1 644 755 B1   9/2014
(Continued)

OTHER PUBLICATIONS

Edson, J.B. et al., "Direct Covariance Flux Estimates from Mobile Platforms at Sea", Journal of Atmospheric and Oceanic Technology, vol. 15, American Meteorological Society, Apr. 1998, pp. 547-562.
(Continued)

*Primary Examiner* — Isam A Alsomiri
*Assistant Examiner* — Amanda J Webster
(74) *Attorney, Agent, or Firm* — Oblon, McClelland, Maier & Neustadt, L.L.P.

(57) ABSTRACT

A line-of-sight (LOS) speed calculator obtains a LOS speed of particles traveling with the atmosphere. A LOS direction corrector corrects a LOS direction using attitude angle information. A wind vector calculator calculates a wind vector expressed with a wind direction and wind speed of the atmosphere at a measurement point by using LOS data including a set of the corrected LOS direction corrected by the LOS direction corrector and the LOS speed obtained by the LOS speed calculator. A shift detection range changer changes a shift detection range that is a divided range of the received signal in the time-domain used for obtaining the Doppler frequency shift to correspond to a range of the received signal reflected by particles at altitudes within a predetermined range including an altitude of the measurement point, on the basis of the attitude angle information.

12 Claims, 26 Drawing Sheets

(51) Int. Cl.
 *G01S 13/95* (2006.01)
 *G01S 17/02* (2006.01)
 *G01S 17/58* (2006.01)

(52) U.S. Cl.
 CPC ............... *G01W 1/00* (2013.01); *Y02A 90/18* (2018.01); *Y02A 90/19* (2018.01)

(56) References Cited

U.S. PATENT DOCUMENTS

| | | | | |
|---|---|---|---|---|
| 7,827,861 | B2* | 11/2010 | LaWhite | G01P 5/24 73/170.01 |
| 8,508,722 | B2 | 8/2013 | Rogers et al. | |
| 9,007,570 | B1* | 4/2015 | Beyon | G01S 17/95 356/28.5 |
| 2004/0252586 | A1* | 12/2004 | Martin | G01N 29/02 367/89 |
| 2007/0236367 | A1* | 10/2007 | Matayoshi | G01P 5/26 340/973 |
| 2010/0052978 | A1* | 3/2010 | Tillotson | G01S 13/88 342/26 B |
| 2014/0026461 | A1* | 1/2014 | Dakin | F41G 3/06 42/111 |
| 2015/0323559 | A1* | 11/2015 | Rondeau | G01S 17/58 701/14 |

FOREIGN PATENT DOCUMENTS

| | | |
|---|---|---|
| JP | 2003-4846 A | 1/2003 |
| JP | 2004-170188 A | 6/2004 |
| JP | 2004-212274 A | 7/2004 |
| JP | 2004-347550 A | 12/2004 |
| JP | 2005-241441 A | 9/2005 |
| JP | 2006-177853 A | 7/2006 |
| JP | 2013-253910 A | 12/2013 |
| JP | 2014-55889 A | 3/2014 |
| WO | WO 2005/008284 A1 | 1/2005 |
| WO | WO 2009/134221 A1 | 11/2009 |

OTHER PUBLICATIONS

Fujitani, Tokunosuke, "*Method of Turbulent Flux Measurement on a Ship by Using a Stable Platform System*", Papers in Meteorology and Geophysics, vol. 36, No. 3, Meteorological Research Institute, Sep. 1985, pp. 157-170.

Browning, K.A. et al., "*The Determination of Kinematic Properties of a Wind Field Using Doppler Radar*", Journal of Applied Meteorology, vol. 7, Feb. 1968., pp. 105-113.

Kobayashi, Takahisa, "*Calculation of East-and-West and North-and-South Components of Direction of Wind and Speed of Wind*", Kisho kenkyu note No. 205, pp. 62-67, Mar. 2004 (with partial translation of corresponding section), 12 pages total.

International Search Report dated Jan. 19, 2017 in PCT/JP2015/080007, filed on Oct. 23, 2015.

\* cited by examiner

WIND MEASURING APPARATUS

TECHNICAL FIELD

The present disclosure relates to wind measuring apparatuses to measure the direction and speed of winds in the atmosphere.

BACKGROUND ART

Conventionally, apparatuses such as Doppler radars, wind profilers, Doppler lidars, and Doppler sodars are used as apparatuses to measure wind at remote locations in the atmosphere. These apparatuses radiate electromagnetic waves or sound waves into space, receive reflection by precipitation particles, atmospheric turbulence, aerosol, etc., and calculate the wind direction and wind speed of winds in the atmosphere from Doppler frequency shifts of the received signals.

Hereinafter, a Doppler lidar is described as an example of a wind measuring apparatus. What is measured directly by a Doppler lidar is a line-of-sight direction component (hereinafter referred to as "LOS speed"), which is a projection onto a direction of a beam of the velocity of aerosol or the like blown by the wind in the atmosphere and thus traveling at the same velocity as that of the wind. By measuring LOS speeds in three or more directions different from each other, and by using the LOS speeds and performing operation such as the velocity azimuth display (VAD) method, which is described in Non-Patent Literature 1, or the three beam method, the four beam method, or the five beam method, which are described in Non-Patent Literature 2, the wind direction and wind speed are calculated.

Such wind measuring apparatuses include those mounted on a traveling platform such as a ship or an aircraft in addition to those fixed on the ground. Other than spontaneous traveling, such a traveling platform generally makes movement affected by the external environment such as winds and waves, that is, motion. For this reason, for example as illustrated in Patent Literature 1 and Patent Literature 2, a motion sensor is added, and by using motion information obtained therefrom, that is, attitude angles (motion angle) such as a roll angle, a pitch angle, and a yaw angle, or an attitude angular velocity and information about an angular acceleration, movement of a platform is controlled such that motion to be received by the platform is canceled, and/or correction taking account of an amount of rotation or movement (translation) due to the motion of the platform is performed on the wind direction and wind speed calculated from measured data containing an influence of the motion.

CITATION LIST

Patent Literatures

Patent Literature 1: JP 2005-241441 A
Patent Literature 2: JP 2004-347550 A

Non-Patent Literatures

Non-Patent Literature 1: Browning, K. A., and R. Wexler, The Determination of Kinematic Properties of a wind field using Doppler radar" J. Appl. Meteo., 7, pp. 105-113, 1968.

Non-Patent Literature 2: Kobayashi Takahisa, Wind Profiler—Denpa de saguru taiki no nagare—, Kisho kenkyu note No. 205, pp. 62-76, 2004.

SUMMARY OF INVENTION

Technical Problem

However, conventional correction for considering motion is performed on a wind direction and wind speed, that is, a wind vector. In the case where a rotational or translational motion is corrected after calculating a wind vector, an error in each LOS direction cannot be corrected. Therefore, there is a problem that an estimation accuracy of a resultant wind vector is deteriorated.

Embodiments of the present disclosure have been devised to solve such a problem, and an object of the present disclosure is to obtain a wind measuring apparatus capable of suppressing deterioration of estimation accuracy of a wind vector.

Solution to Problem

A wind measuring apparatus according to the present disclosure includes: a signal transmitter/receiver to radiate a radiation signal of an electromagnetic wave or sound wave in a line-of-sight direction into an atmosphere, and to receive a reflection signal being the radiation signal reflected by particles traveling together with the atmosphere; a frequency analyzer to obtain a Doppler frequency shift between a received signal and the radiation signal, the received signal being the reflection signal received by the signal transmitter/receiver; a line-of-sight speed calculator to obtain a line-of-sight speed from the Doppler frequency shift; a motion sensor to detect motion information including attitude angle information being an attitude angle of a support object to which the signal transmitter/receiver is fixed; a line-of-sight direction corrector to correct the line-of-sight direction by using the attitude angle information; and a wind vector calculator to calculate a wind direction and wind speed representing a wind vector of the atmosphere at a measurement point located at a predetermined position with respect to the signal transmitter/receiver by using line-of-sight data including a set of the corrected line-of-sight direction corrected by the line-of-sight direction corrector and the line-of-sight speed; and a shift detection range changer to change a shift detection range being a divided range of the received signal in the time-domain used by the frequency analyzer for obtaining the Doppler frequency shift to correspond to a range of the received signal reflected by particles at altitudes within a predetermined range including an altitude of the measurement point, on the basis of the attitude angle information.

Advantageous Effects of Invention

According to a wind measuring apparatus according to the present disclosure, it is possible to obtain a highly accurate wind vector by considering an error in each LOS direction at the time of calculating the wind vector.

DESCRIPTION OF EMBODIMENTS

To describe this disclosure further in detail, embodiments according to the disclosure are described below with reference to the accompanying drawings.

First Embodiment

Figure 1:
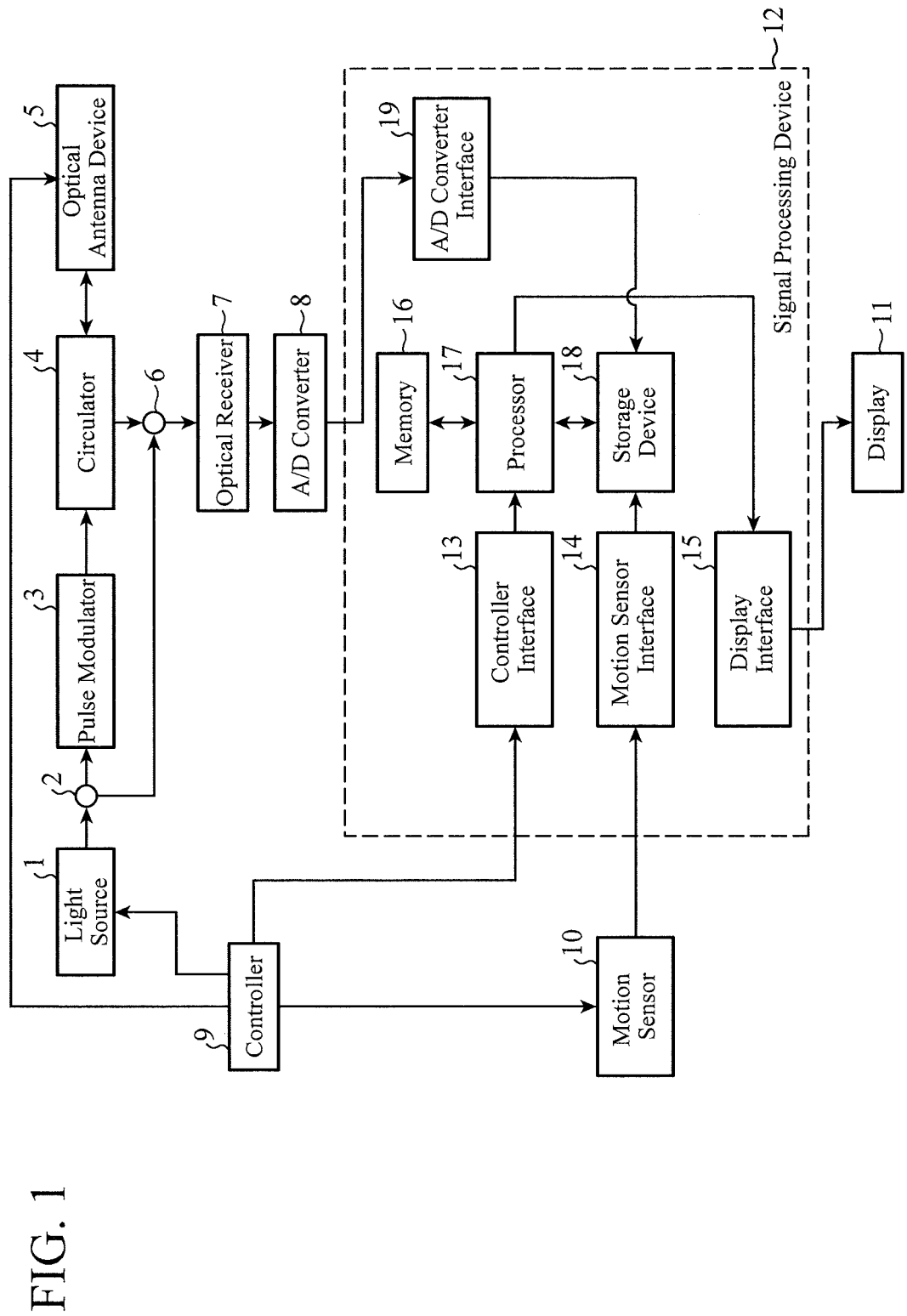
FIG. 1 is a hardware configuration diagram of a wind measuring apparatus according to this disclosure.

FIG. 1 is a hardware configuration diagram illustrating a wind measuring apparatus according to this disclosure. In the description, the hardware configuration is the same in all the embodiments. Embodiments of this disclosure can be implemented with a hardware configuration different from that in FIG. 1. FIG. 1 illustrates an exemplary hardware configuration.

The wind measuring apparatus illustrated in FIG. 1 includes a light source 1, a splitter 2, a pulse modulator 3, a circulator 4, an optical antenna device 5, a coupler 6, an optical receiver 7, an A/D converter 8, a controller 9, a motion sensor 10, a display 11, and a signal processing device 12. The signal processing device 12 includes a controller interface 13, a motion sensor interface 14, a display interface 15, a memory 16, a processor 17, a storage device 18, and an A/D converter interface 19.

The light source 1 outputs light of a continuous wave with a single frequency. The laser light from the light source 1 is output to the splitter 2. The splitter 2 splits the laser light from the light source 1 into two beams. While one of the two beams of laser light split by the splitter 2 is output to the pulse modulator 3, the other is output to the coupler 6. The pulse modulator 3 applies a predetermined frequency shift to the laser light received from the splitter 2, and further performs pulse modulation on it. The laser light that is frequency-modulated and pulse-modulated by the pulse modulator 3 is output to the circulator 4.

The circulator 4 switches output destinations according to the input port into which the laser light is input. The circulator 4 outputs the laser light provided from the pulse modulator 3 to the optical antenna device 5, and the laser light provided from the optical antenna device 5 to the coupler 6. The optical antenna device 5 functions as a signal transmitter/receiver to emit the laser light provided from the circulator 4 into the atmosphere in a predetermined direction with respect to the wind measuring apparatus, and to collect the scattered light that is the emitted laser light scattered from aerosol. The scattered light collected by the optical antenna device 5 is output to the coupler 6 via the circulator 4. The coupler 6 combines the laser light from the splitter 2 and the laser light from the optical antenna device 5 via the circulator 4. The combined laser light output from the coupler 6 is provided to the optical receiver 7. The optical receiver 7 extracts a low frequency component by heterodyne detection from the laser light output from the coupler 6, irradiates a photoelectric conversion element with light oscillating at the extracted low frequency, and converts it into an electric signal. The electrical signal converted by the optical receiver 7 is output to the A/D converter 8. The A/D converter 8 analog-to-digital (A/D) converts the electric signal output from the optical receiver 7. Signals converted by the A/D converter 8 at a predetermined sampling rate are output to the storage device 18 via the A/D converter interface 19 in the signal processing device 12.

A case where laser light in the visible light region is used as an electromagnetic wave is described herein. As the electromagnetic wave, an infrared beam or a radio wave having longer wavelengths may be used. Alternatively, a sound wave may be used. The signal transmitter/receiver may have any configuration as long as the configuration enables radiating a radiation signal that is an electromagnetic wave or a sound wave and receiving a reflected wave thereof.

Meanwhile, the motion sensor 10 includes a gyro sensor to detect motion of the platform, a global positioning system (GPS) to output the position of the platform, a magnetic compass to output azimuth information, and the like, and acquires motion information of the platform (position, azimuth, three-axis attitude angle, attitude angular velocity, three-axis translational velocity). The motion sensor 10 is mounted on the same platform as the optical antenna device 5 and other components. The platform is a support object to which the signal transmitter/receiver is fixed. The motion information acquired by the motion sensor 10 is output to the storage device 18 via the motion sensor interface 14 in the signal processing device 12. The processor 17 in the signal processing device 12 receives a control signal from the controller 9 via the controller interface 13, reads received signals, motion information, programs, and other information from the storage device 18 into the memory 16, and executes functional parts such as LOS speed calculation, LOS direction correction, Translational velocity correction, Device relative velocity correction, and Wind vector calculation. Wind vectors calculated by the processor 17 are output to the display 11 via the display interface 15. The display 11 displays the wind vectors calculated by the processor 17 via the display interface 15. The wind vectors are stored in the storage device 18. The controller 9 outputs a control signal for laser light transmission to the light source 1, outputs a control signal for beam scanning to the optical antenna device 5, outputs a control signal to acquire motion information to the motion sensor 10, and outputs a control signal for calculating a LOS speed, correcting the LOS speed, and calculating a wind vector to the processor 17 via the controller interface 13.

Figure 2:
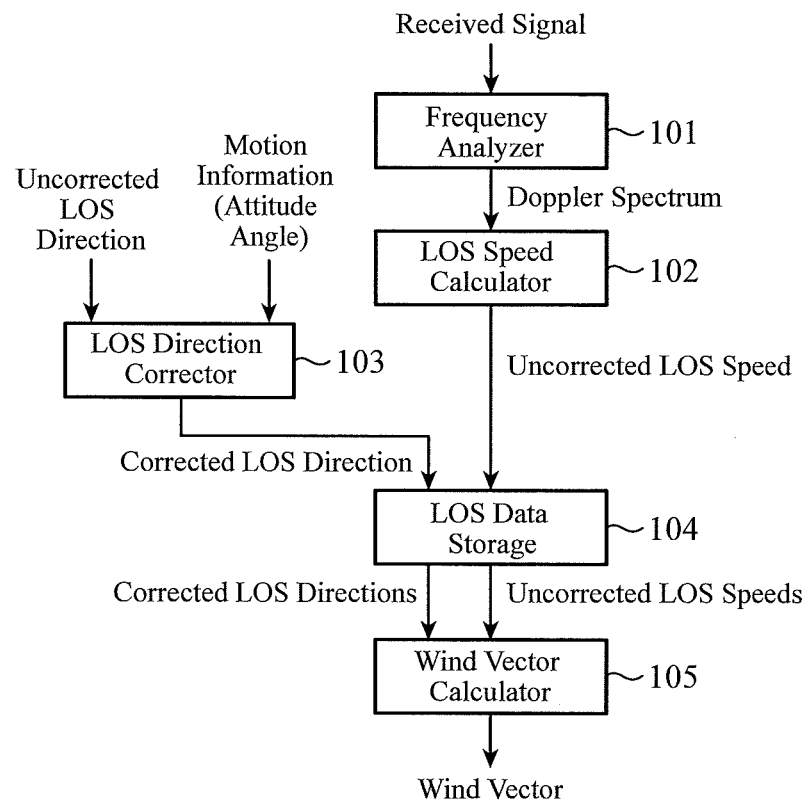
FIG. 2 is a block configuration diagram illustrating functional parts implemented by a signal processing device according to First Embodiment of this disclosure.

FIG. 2 is a block configuration diagram illustrating functional parts implemented by the signal processing device.

A frequency analyzer 101 is a processing part that performs Fourier transformation on a received signal input thereto to calculate a Doppler spectrum. That is, the frequency analyzer 101 is a calculator that obtains a Doppler frequency shift between the signal transmitted and a signal received by the optical antenna device 5. A LOS speed calculator 102 is a processing part that incoherently integrates a predetermined number of Doppler spectra, and performs peak detection to calculate a Doppler speed as an uncorrected LOS speed. A LOS direction corrector 103 is a processing part that uses both a predetermined LOS direction with respect to the wind measuring apparatus in a state without motion (this is regarded as an uncorrected LOS direction) and attitude angle information included in the motion information output from the motion sensor 10 illustrated in FIG. 1 to rotate the uncorrected LOS direction in accordance with a change in attitude angles caused by the motion, and outputs a corrected LOS direction as an actual LOS direction. A LOS data storage 104 is a processing part that stores LOS data including the uncorrected LOS speed from the LOS speed calculator 102 and the corrected LOS direction from the LOS direction corrector 103. A wind vector calculator 105 is a processing part that uses a plurality of corrected LOS directions and a plurality of uncorrected LOS speeds stored in the LOS data storage 104 to calculate and to output a wind vector. The above frequency analyzer 101 through the wind vector calculator 105 are implemented by the processor 17 reading a program corresponding to each of the functional parts from the storage device 18, deploying the program on the memory 16, and executing the program.

Operations of the wind measuring apparatus of First Embodiment are described. General processing used in measuring operation (e.g., FFT, moment method, pulse pair method) is publicly known, and thus a detailed description of such processing is omitted.

Light pulses are emitted toward the atmosphere and reflected waves reflected from aerosols or the like, which are particles moving in a similar manner to that of the atmosphere, are received. The reflected waves are A/D converted at a predetermined sampling frequency, and received signals after A/D conversion are input into the frequency analyzer 101. The frequency analyzer 101 divides a received signal in the time domain in accordance with predetermined altitude segments to measure wind speed, performs Fourier transform (as a specific means, fast Fourier transform (FFT) processing) on each of the divided portions of the received signal, thereby calculates a Doppler spectrum (power spectrum), and outputs the calculation result to the LOS speed calculator 102.

The LOS speed calculator 102 performs integration (incoherent integration) processing of a predetermined number of Doppler spectra, which are output from the frequency analyzer 101, calculates a Doppler speed from the Doppler spectrum obtained after the integration by using the moment method, and outputs the calculation result to the LOS data storage 104. The Doppler speed is not corrected by considering motion, and thus it is an uncorrected LOS speed. Although Doppler information is obtained using the moment method here, a pulse pair method or other methods to obtain Doppler information from an amount of change in phase between pulses may also be used.

The LOS direction corrector 103 performs a rotational operation on a unit vector in a predetermined LOS direction (beam direction) by using a rotation matrix derived from the attitude angles in the motion information, thereby calculating a LOS direction unit vector that is obtained by considering the occurred motion, i.e., calculating a corrected LOS direction unit vector, and outputting the calculation result to the LOS data storage 104. This is expressed by Expression (1) as follows.

$$\vec{e}_c = T\vec{e} \tag{1}$$

Figure 3:
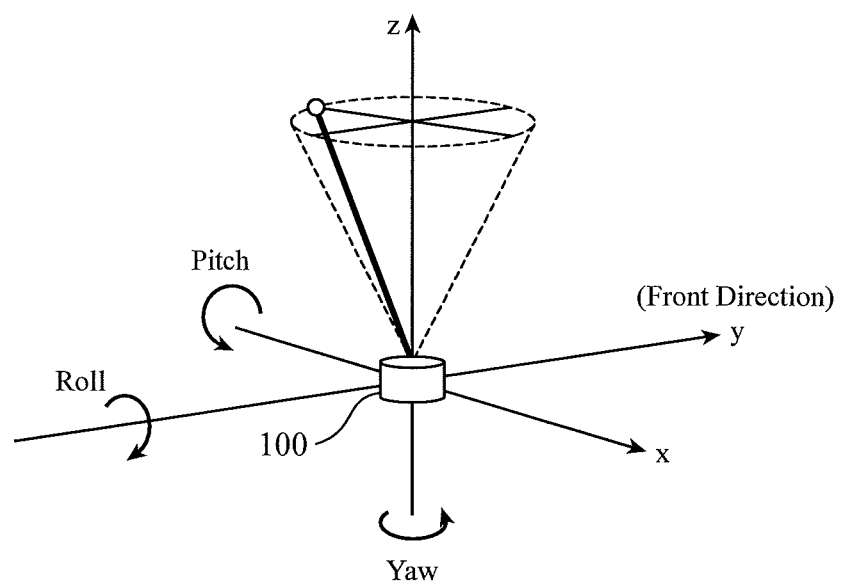
FIG. 3 is an explanatory diagram illustrating an x-y-z coordinate system of the wind measuring apparatus.

$\vec{e}_c$: Corrected unit vector $\vec{e}$: Unit vector in predetermined LOS (beam) direction T: Rotation matrix derived from attitude angles in motion information The rotation matrix T is a composite of rotations of attitude angles that are described as roll, pitch, and yaw. In the x-y-z coordinate system as illustrated in FIG. 3, assuming that the y axis faces the front, and denoting a roll angle in rotation around the y axis (rotation in an advancing direction of a right-hand screw is regarded as positive) by "roll", a pitch angle in rotation around the x axis (rotation in an advancing direction of a right-hand screw is regarded as positive) by "pitch", and a yaw angle in rotation around the z axis (rotation in an advancing direction of a right-hand screw is regarded as positive) by "yaw", the rotation matrix T is described by Expression (2) below.

calculated from LOS data of n lines-of-sight of four or more is expressed by Expression (3), and a case where a wind vector is calculated from LOS data of three lines-of-sight is expressed by Expression (4).

$$\vec{V} = \begin{pmatrix} \sum_{i=1}^{n} \alpha_i^2 & \sum_{i=2}^{n} \alpha_i \beta_i & \sum_{i=1}^{n} \gamma_i \alpha_i \\ \sum_{i=1}^{n} \alpha_i \beta_i & \sum_{i=1}^{n} \beta_i^2 & \sum_{i=1}^{n} \beta_i \gamma_i \\ \sum_{i=1}^{n} \gamma_i \alpha_i & \sum_{i=1}^{n} \beta_i \gamma_i & \sum_{i=1}^{n} \gamma_i^2 \end{pmatrix}^{-1} \begin{pmatrix} \sum_{i=1}^{n} V_{oi} \alpha_i \\ \sum_{i=1}^{n} V_{oi} \beta_i \\ \sum_{i=1}^{n} V_{oi} \gamma_i \end{pmatrix} \tag{3}$$

where $V_{oi}$: i-th (uncorrected) LOS speed $\vec{V}$: Wind vector $\alpha_i, \beta_i, \gamma_i$: Elements of i-th, corrected (rotated) LOS direction unit vector $\vec{e}_{ci}$ $$\vec{V} = \begin{pmatrix} \alpha_1 & \beta_1 & \gamma_1 \\ \alpha_2 & \beta_2 & \gamma_2 \\ \alpha_3 & \beta_3 & \gamma_3 \end{pmatrix}^{-1} \begin{pmatrix} V_{o1} \\ V_{o2} \\ V_{o3} \end{pmatrix} \tag{4}$$

Figure 4:
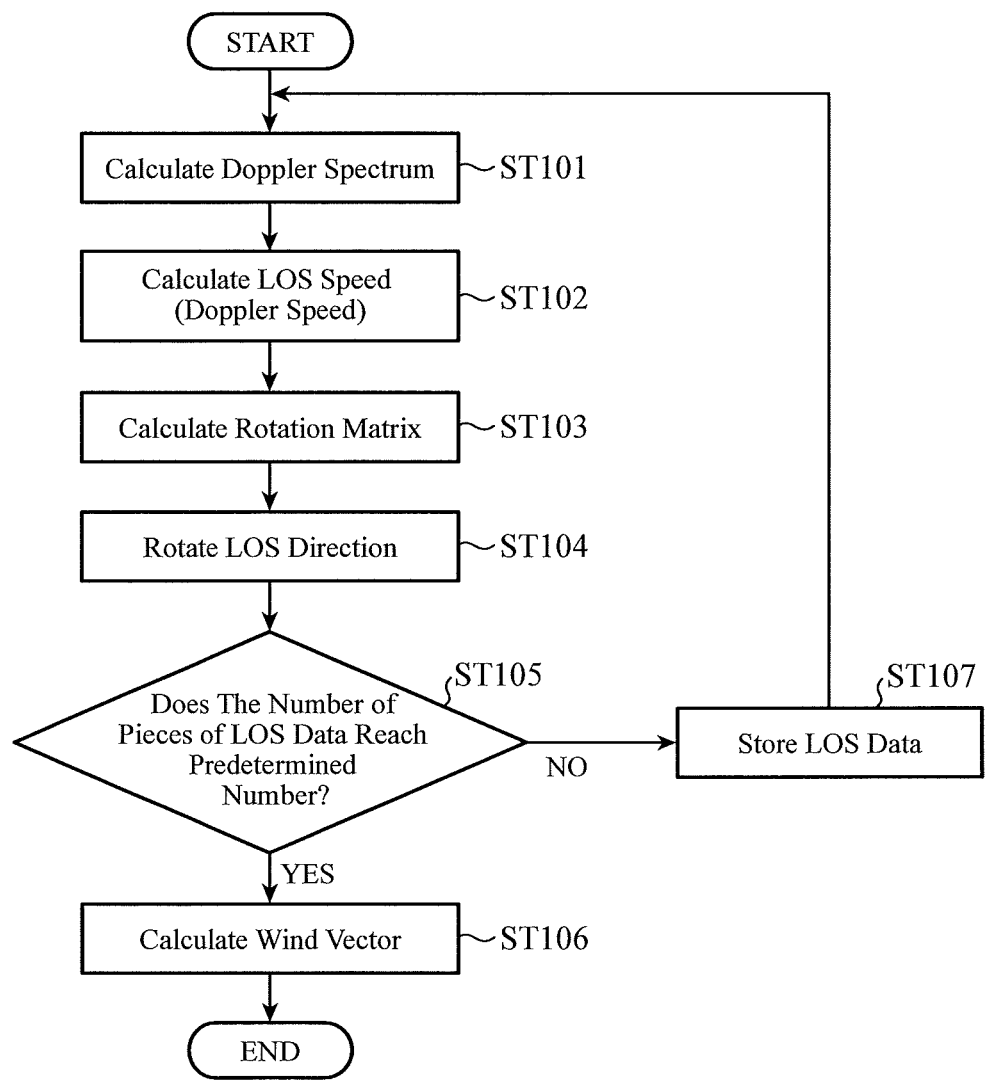
FIG. 4 is a flowchart illustrating operations of the wind measuring apparatus of First Embodiment of this disclosure.

FIG. 4 illustrates a flowchart of a signal processing part of the wind measuring apparatus according to First Embodiment.

After the received signal is input to the frequency analyzer 101, first, the frequency analyzer 101 calculates a Doppler spectrum (step ST101). Next, the LOS speed calculator 102 calculates a LOS speed (Doppler speed) (step ST102). On the other hand, the LOS direction corrector 103 calculates the rotation matrix by using the attitude angle information included in the motion information (step ST103), and uses the calculation result to rotate the LOS $$T = \begin{pmatrix} \cos(yaw) & -\sin(yaw) & 0 \\ \sin(yaw) & \cos(yaw) & 0 \\ 0 & 0 & 1 \end{pmatrix} \begin{pmatrix} 1 & 0 & 0 \\ 0 & \cos(pitch) & -\sin(pitch) \\ 0 & \sin(pitch) & \cos(pitch) \end{pmatrix} \begin{pmatrix} \cos(roll) & 0 & \sin(roll) \\ 0 & 1 & 0 \\ -\sin(roll) & 0 & \cos(roll) \end{pmatrix} = \tag{2}$$

$$\begin{pmatrix} \cos(yaw)\cos(roll) - \sin(yaw)\sin(pitch)\sin(roll) & -\sin(yaw)\cos(pitch) & \cos(yaw)\sin(roll) + \sin(yaw)\sin(pitch)\cos(roll) \\ \sin(yaw)\cos(roll) + \cos(yaw)\sin(pitch)\sin(roll) & \cos(yaw)\cos(pitch) & \sin(yaw)\sin(roll) - \cos(yaw)\sin(pitch)\cos(roll) \\ -\cos(pitch)\sin(roll) & \sin(pitch) & \cos(pitch)\cos(roll) \end{pmatrix}$$

The LOS data storage 104 stores uncorrected LOS speeds output from the LOS speed calculator 102 and corrected LOS directions output from the LOS direction corrector 103. Thereafter, when data of LOS speeds and LOS directions of a predetermined number or more is accumulated, the data is output to the wind vector calculator 105 as LOS data. Generally, three or more sets of LOS speeds and LOS directions enable to calculate a wind vector in a three-dimensional space.

The wind vector calculator 105 calculates a wind vector (wind direction and wind speed) by using data including a plurality of the uncorrected LOS speeds, which are acquired from the LOS data storage 104, and the same number of the corrected LOS directions. A case where a wind vector is direction with respect to the LOS direction in a state without motion (step ST104). The data of the corrected LOS direction is output to the LOS data storage 104. The LOS data storage 104 determines whether the number of pieces of acquired data reaches a predetermined number (step ST105) and, when the predetermined number is reached, outputs the data to the wind vector calculator 105. Then the wind vector calculator 105 calculates a wind vector (step ST106). When the predetermined number is not reached in step ST105, the LOS data is stored (step ST107), and the flow returns to step ST101.

In First Embodiment, since the LOS direction is corrected for each piece of LOS data used for measurement, a highly accurate wind vector can be obtained.

According to the wind measuring apparatus of First Embodiment, the apparatus includes: a signal transmitter/receiver to radiate a radiation signal of an electromagnetic wave or sound wave in a line-of-sight direction into an atmosphere, and receiving a reflection signal that is the radiation signal that is reflected by particles traveling together with the atmosphere; a frequency analyzer to obtain a Doppler frequency shift between a received signal and the radiation signal, the received signal being the reflection signal that is received by the signal transmitter/receiver; a line-of-sight speed calculator to obtain a line-of-sight speed from the Doppler frequency shift; a motion sensor to detect motion information including attitude angle information that is an attitude angle of a support object to which the signal transmitter/receiver is fixed; a line-of-sight direction corrector to correct the line-of-sight direction by using the attitude angle information; and a wind vector calculator to calculate a wind direction and wind speed representing a wind vector of the atmosphere at a measurement point located at a predetermined position with respect to the signal transmitter/receiver by using line-of-sight data including a set of the corrected line-of-sight direction corrected by the line-of-sight direction corrector and the line-of-sight speed. This enables suppressing degradation of estimation accuracy of the wind vector.

Second Embodiment

In First Embodiment, the attitude angles are used as the motion information, and a change in the attitude angles such as roll, pitch, yaw due to the motion of the platform is corrected. Motion of an object can be decomposed into rotational motion around the center of motion and translational motion which is travel of the center of motion. The velocity of translational motion is called translational velocity. In Second Embodiment, the translational motion is also used to correct the LOS speed. In the following drawings, those having the same function as those in the above drawings are denoted by the same symbols, and descriptions thereof are omitted.

Figure 5:
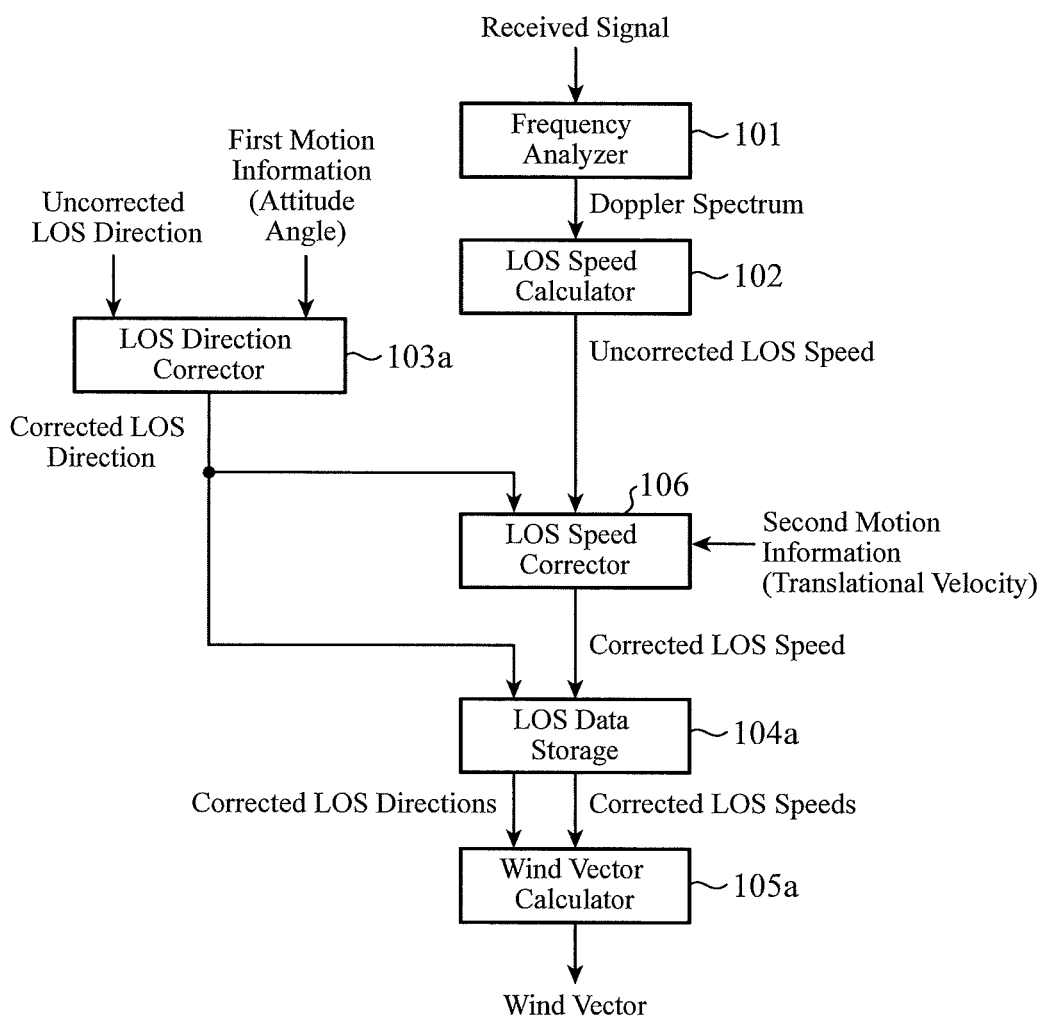
FIG. 5 is a block configuration diagram illustrating functional parts implemented by a signal processing device according to Second embodiment of this disclosure.

FIG. 5 is a block configuration diagram illustrating functional parts implemented by a signal processing device in a wind measuring apparatus according to Second Embodiment. The motion information of the attitude angles indicated as motion information in FIG. 2 is indicated as first motion information in FIG. 5, to be distinguished with other motion information. A LOS speed corrector 106 is a processing part that performs correction on a LOS speed by using a translational velocity (vector) of the platform being second motion information, the uncorrected LOS speed output from the LOS speed calculator 102, and a corrected LOS direction output from a LOS direction corrector 103a.

Operations of Second Embodiment are described. Only parts different from those of First Embodiment are described.

The LOS speed corrector 106 calculates a component of the translational speed along a corrected LOS direction from an inner product of the translational velocity (vector) of the platform being the second motion information and the unit vector of the corrected LOS direction obtained from the LOS direction corrector 103a, and outputs a corrected LOS speed in which the calculated component is added to the uncorrected LOS speed. An i-th corrected LOS speed is expressed by Expression (5) below, in which the signs "<" and ">" represent the inner product.

$$V_{coi} = V_{oi} + \langle \vec{V}_{pf}, \vec{e}_{ci} \rangle \quad (5)$$

$V_{oi}$: i-th uncorrected LOS speed
$V_{coi}$: i-th corrected LOS speed
$V_{pf}$: Translational velocity of platform
$\vec{e}_{ci}$: Unit vector in i-th corrected LOS direction A LOS data storage 104a stores a corrected LOS speed from the LOS speed corrector 106 and a corrected LOS direction from the LOS direction corrector 103a. Thereafter, when data of a predetermined number of corrected LOS speeds and corrected LOS directions is accumulated, the predetermined number of pieces of LOS data is output to a wind vector calculator 105a.

The wind vector calculator 105a calculates a wind vector using the corrected LOS directions acquired from the LOS data storage 104a and the same number of corrected LOS speeds. Also with a corrected LOS speed $V_{coi}$, Expression (3) is used in a case where a wind vector is calculated from LOS data of n lines of four or more lines, Expression (4) is used in a case where a wind vector is calculated from LOS data of three lines.

Figure 6:
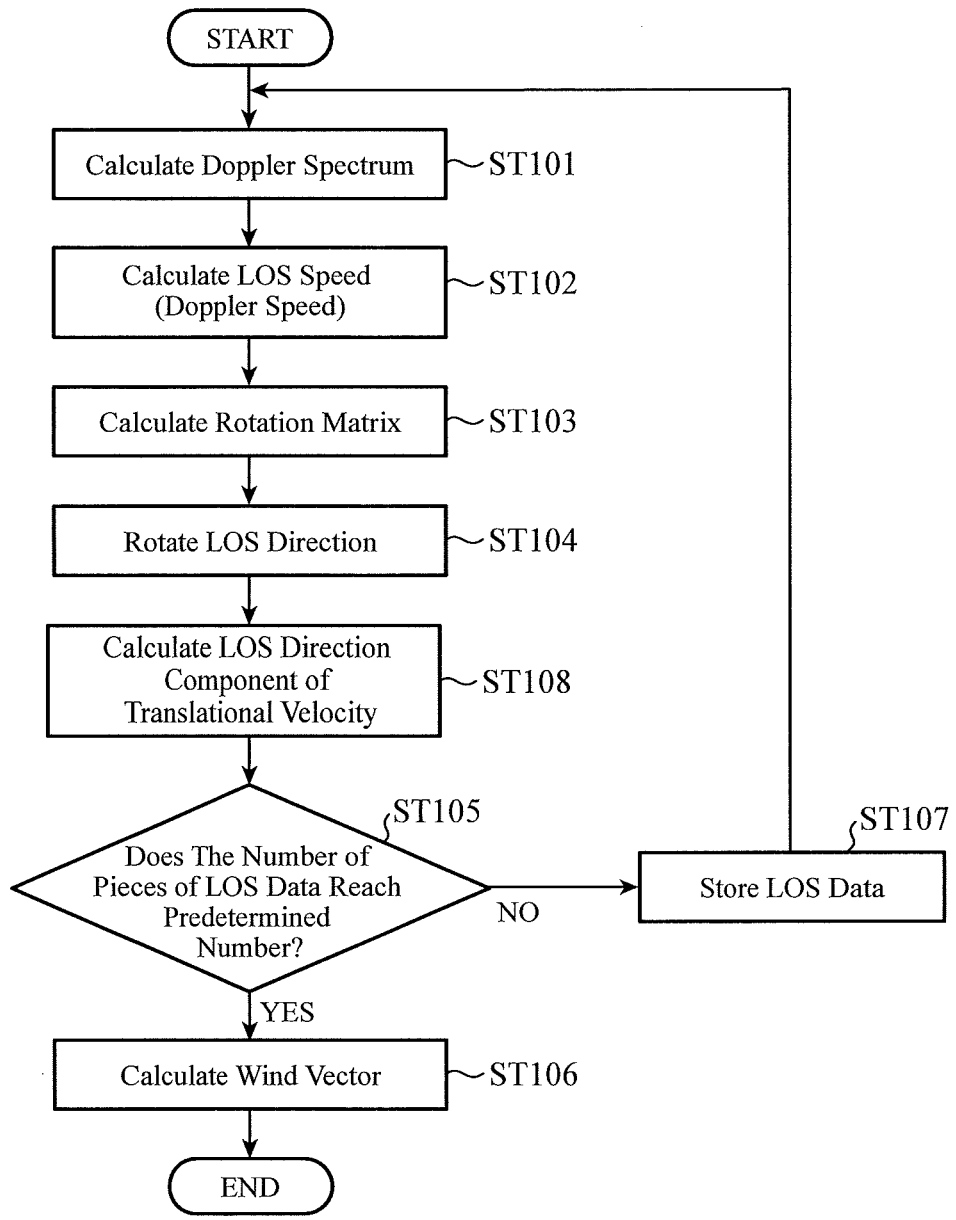
FIG. 6 is a flowchart illustrating operations of a wind measuring apparatus of Second Embodiment of this disclosure.

FIG. 6 illustrates a flowchart of a signal processing part of the wind measuring apparatus according to Second Embodiment. Here, steps ST101 to ST104 are the same as those in First Embodiment illustrated in FIG. 4, and thus descriptions thereof are omitted. Next, the LOS speed corrector 106 calculates a component in the LOS direction of the translational velocity using the translational velocity which is the second motion information (step ST108), and outputs the corrected LOS speed to the LOS data storage 104a as the corrected LOS speed. The LOS data storage 104a determines whether the acquired number of pieces of LOS data reaches a predetermined number (step ST105) and, when the predetermined number is reached, outputs the LOS data to the wind vector calculator 105a. Then the wind vector calculator 105a calculates a wind vector (step ST106). When the predetermined number is not reached in step ST105, the acquired LOS data is stored (step ST107), and the flow returns to step ST101.

In Second Embodiment, a LOS direction is corrected for each piece of LOS data being measured, and the LOS speed is corrected by adding an effect of the translational velocity to the LOS speed. Thus, a highly accurate wind vector can be obtained.

According to the wind measuring apparatus of Second Embodiment, the motion sensor detects translational velocity information which is a traveling velocity of the support object, and the wind measuring apparatus includes the LOS speed corrector to correct the LOS speed obtained by the LOS speed calculator using the translational velocity information. Therefore, degradation of estimation accuracy of the wind vector can be suppressed.

Third Embodiment

In First Embodiment and Second Embodiment, the attitude angles are used as motion information, and the correction for motion of the attitude angles such as the roll, the pitch, and the yaw and the correction for the translational motion are performed. In a case where the Doppler lidar and the motion sensor 10 are arranged apart from each other, a velocity and an angular velocity detected by the motion sensor 10 are different from a velocity and an angular velocity at the position of the Doppler lidar. Thus, a relative velocity between these devices upon rotary motion is also included in a LOS speed as an error. Therefore, it is necessary to correct also an influence of such a relative velocity of the device, and an example of performing such correction is described as Third Embodiment.

Figure 7:
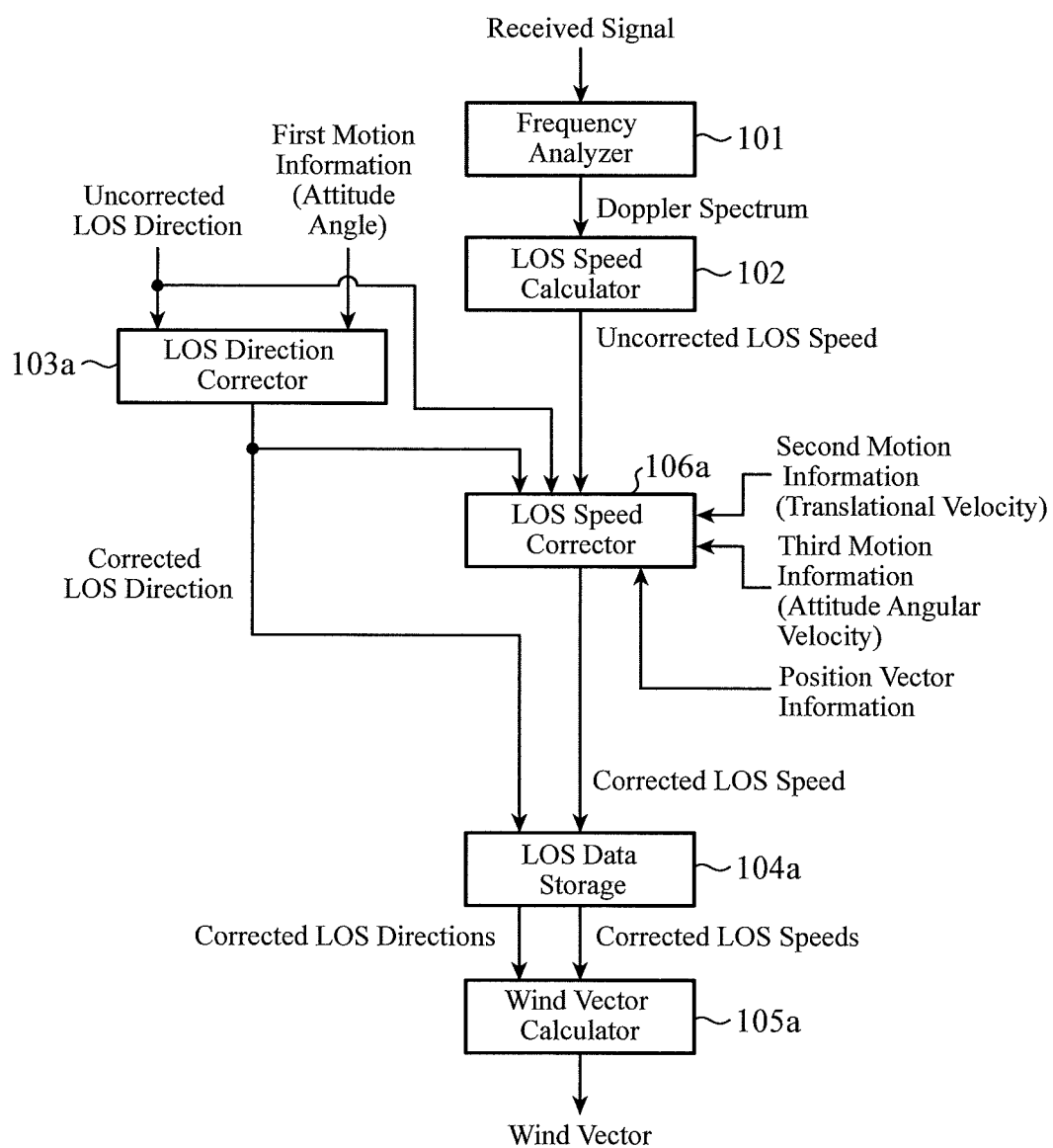
FIG. 7 is a block configuration diagram illustrating functional parts implemented by a signal processing device of Third Embodiment of this disclosure.

FIG. 7 is a block configuration diagram illustrating functional parts implemented by a signal processing device in a wind measuring apparatus according to Third Embodiment. The motion information of the attitude angles indicated as motion information in FIG. 2 is indicated as first motion information in FIG. 7, and these are distinguished from each other. A LOS speed corrector 106a is a processing part that performs correction on a LOS speed by using a translational velocity (vector) of a platform being second motion information, an attitude angular velocity being third motion information of the platform, position vector information, an uncorrected LOS speed output from the LOS speed calculator 102, and an uncorrected LOS direction and a corrected LOS direction output from the LOS direction corrector 103a. Here, the position vector information means both a position vector of the Doppler lidar with respect to the center of motion of the platform and a position vector of the motion sensor 10 with respect to the motion center, or a position vector of the Doppler lidar with respect to the motion sensor 10.

Operations of Third Embodiment are described. Only parts different from those of First and Second Embodiments are described.

In the LOS speed corrector 106a, a relative velocity component of the device is calculated from a cross product of the attitude angular velocity of the platform being the third motion information, and both the position vector of the Doppler lidar with respect to the center of motion and the position vector of the motion sensor with respect to the center of motion, or a cross product of the attitude angular velocity of the platform and a relative position vector of the Doppler lidar with respect to the motion sensor 10. The position vector of the Doppler lidar with respect to the center of motion, the position vector of the motion sensor with respect to the center of motion, and the relative position vector of the Doppler lidar with respect to the motion sensor 10, that are, position vector information are obtained. Furthermore, a LOS speed component is calculated from an inner product of the relative velocity component of the device and a unit vector of the uncorrected LOS speed, and a corrected LOS speed in which the LOS speed component is added to the uncorrected LOS speed is output. The corrected LOS speed is expressed by Expression (6). In Expression (6), the resultant vectors of the cross products of the attitude angular velocity and the position vectors of the devices, and the unit vector in the uncorrected LOS direction may be multiplied by a rotation matrix, and the unit vector in the corrected LOS direction may be used instead of a unit vector in the uncorrected LOS direction, which can be expressed by the following Expression (7). Here, the signs "<" and ">" represent an inner product, and × represents a cross product. The correction using the translational motion may not be performed.

$$V_{coi} = V_{oi} + \langle \vec{\Omega} \times \vec{OD}, \vec{e_i}\rangle - \langle \vec{\Omega}, \vec{OS}, \vec{e_i}\rangle + \langle \vec{V_{pf}}, \vec{e_{ci}}\rangle \quad (6)$$
$$= V_{oi} + \langle \vec{\Omega} \times (\vec{OD} - \vec{OS}), \vec{e_i}\rangle + \langle \vec{V_{pf}}, \vec{e_{ci}}\rangle$$
$$= V_{oi} + \langle \vec{\Omega} \times \vec{SD}, \vec{e_i}\rangle + \langle \vec{V_{pf}}, \vec{e_{ci}}\rangle$$

$\vec{e_i}$: Unit vector of i-th uncorrected LOS speed
$\vec{\Omega}$: Attitude angular velocity $\vec{OD}$: Position vector of installation position of Doppler lidar with respect to motion center of platform $\vec{OS}$: Position vector of installation position of motion sensor with respect to motion center of platform $\vec{SD}$: Position vector of installation position of Doppler lidar with respect to installation position of motion sensor, $\vec{SD} = \vec{OD} - \vec{OS}$ $V_{oi}$: i-th uncorrected LOS speed
$V_{coi}$: i-th corrected LOS speed $$V_{coi} = V_{oi} + \langle T(\vec{\Omega} \times \vec{OD}), T\vec{e_i}\rangle - \langle T(\vec{\Omega} \times \vec{OS}), T\vec{e_i}\rangle + \langle \vec{V_{pf}}, \vec{e_{ci}}\rangle \quad (7)$$
$$= V_{oi} + \langle T(\vec{\Omega} \times (\vec{OD} - \vec{OS})), T\vec{e_i}\rangle + \langle \vec{V_{pf}}, \vec{e_{ci}}\rangle$$
$$= V_{oi} + \langle T(\vec{\Omega} \times \vec{SD}), T\vec{e_i}\rangle + \langle \vec{V_{pf}}, \vec{e_{ci}}\rangle$$
$$= V_{oi} + \langle T(\vec{\Omega} \times \vec{SD}), \vec{e_i}\rangle + \langle \vec{V_{pf}}, \vec{e_{ci}}\rangle$$

$\vec{e_{ci}}$: Unit vector of i-th corrected LOS speed

A LOS data storage 104a stores the corrected LOS speed and the corrected LOS direction from the LOS direction corrector 103a as LOS data. Thereafter, when data of LOS speeds and LOS directions of a predetermined number is accumulated, the data is output to a wind vector calculator 105a.

The wind vector calculator 105a calculates a wind vector using the same number of corrected LOS speeds and corrected LOS directions, which are output from the LOS data storage 104a. In a case of obtaining a wind vector from LOS data of n lines of four or more lines, Expression (3) is used. Alternatively, in a case of obtaining a wind vector from LOS data of three lines, Expression (4) is used.

Figure 8:
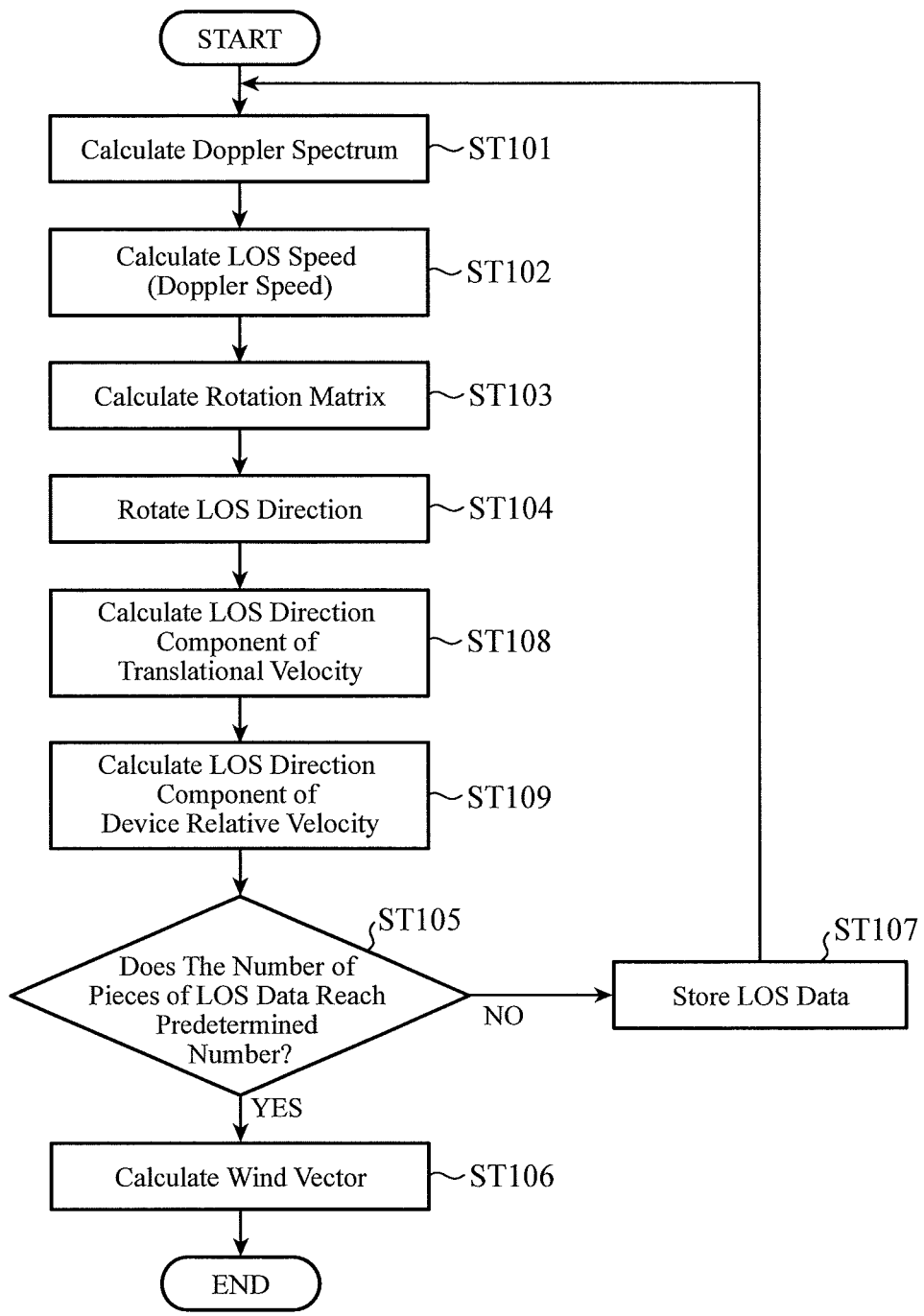
FIG. 8 is a flowchart illustrating operations of a wind measuring apparatus of Third Embodiment of this disclosure.

FIG. 8 illustrates a flowchart of a signal processing part of the wind measuring apparatus according to Third Embodiment. Here, steps ST101 to ST108 are the same as the processing steps in Second Embodiment illustrated in FIG. 6, and thus descriptions thereof are omitted. Next, the LOS speed corrector 106a calculates a component in the LOS direction of the relative velocity of the device using the third motion information, that is, the attitude angular velocity (step ST109), and outputs the corrected LOS speed to the LOS data storage 104a as the corrected LOS speed. The LOS data storage 104a determines whether the acquired number of pieces of LOS data reaches a predetermined number (step ST105) and, when the predetermined number is reached, outputs the LOS data to the wind vector calculator 105a. Then the wind vector calculator 105a calculates a wind vector (step ST106). When the predetermined number is not reached in step ST105, the acquired LOS data is stored (step ST107), and the flow returns to step ST101.

In Third Embodiment, the LOS direction is corrected for each LOS data being measured and is corrected by adding effects of the translational velocity and the device relative velocity to the LOS speed, and thus a highly accurate wind vector can be obtained.

According to the wind measuring apparatus of Third Embodiment, the motion sensor detects translational velocity information which is a traveling velocity of the support object and the attitude angular velocity information which is a change rate of the attitude angle of the support object, and the LOS speed corrector corrects the LOS speed obtained by the LOS speed calculator using the translational velocity information and the attitude angular velocity information.

Therefore, the degradation of estimation accuracy of the wind vector can be suppressed.

Fourth Embodiment

In First to Third Embodiments, the number of pieces of LOS data used for wind vector calculation is simply a predetermined number. In a wind measuring apparatus according to the present disclosure, it is also possible to use an intended updating rate which is an updating rate that is preferable, that is, three or more pieces of LOS data in accordance with a calculation time interval of a wind vector can also be used, which is described as Fourth Embodiment.

Figure 9:
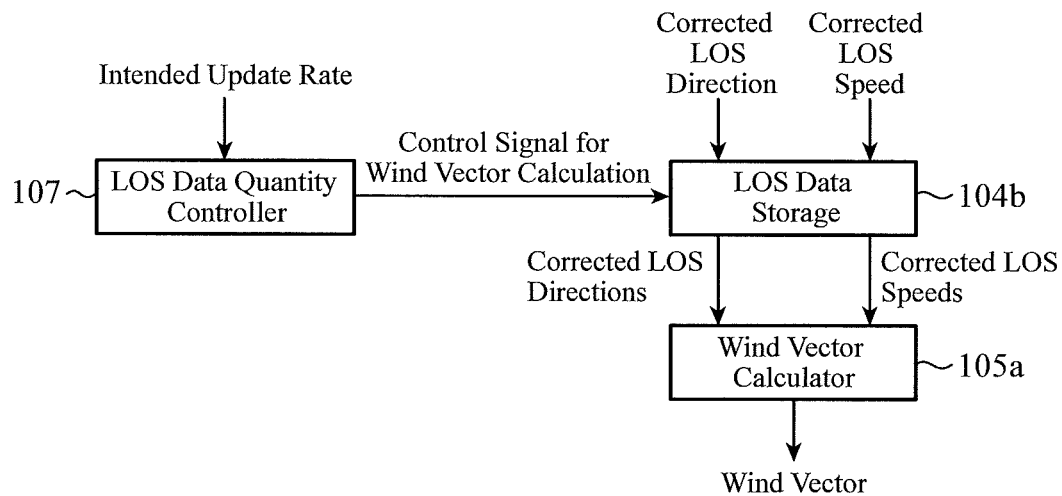
FIG. 9 is a block configuration diagram illustrating the main part of functional parts implemented by a signal processing device according to Fourth Embodiment of this disclosure.

FIG. 9 is a block configuration diagram illustrating the main part of functional parts implemented by a signal processing device according to Fourth Embodiment.

A LOS data quantity controller 107 is a processing part that calculates the number of pieces of LOS data to be used using a preset intended update rate and outputs the calculation result to a LOS data storage 104b. In addition, the LOS data storage 104b is configured to determine whether the acquired number of pieces of LOS data reaches a predetermined number on the basis of the number of pieces of LOS data obtained by the LOS data quantity controller 107.

Operations of Fourth Embodiment are described.

The LOS data quantity controller 107 calculates the number of pieces of LOS data acquired during the preset intended update rate. For example, where an update rate of LOS data which is a time interval for acquiring each piece of LOS speed data of the Doppler lidar is a seconds and the intended update rate is b seconds, [b/a] ([x] is the maximum integer not exceeding x) is the number of Lines-of-sight to be used. However, when [b/a] is less than 3, the number of Lines-of-sight is determined to three or more.

Figure 10:
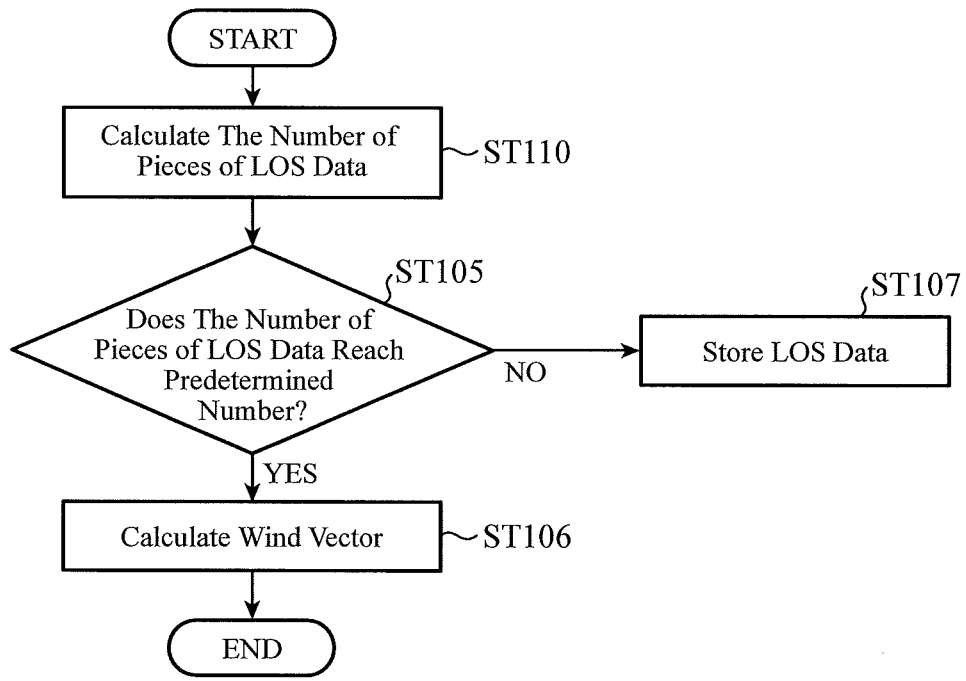
FIG. 10 is a flowchart illustrating operations of a wind measuring apparatus of Fourth Embodiment of this disclosure.

FIG. 10 illustrates a flowchart of a signal processing part of the wind measuring apparatus according to Fourth Embodiment. In FIG. 10, illustration of parts common to First to Third Embodiments is omitted. That is, after performing any one set of processing of steps ST101 to ST104 of First Embodiment, steps ST101 to ST108 of Second Embodiment, and steps ST101 to ST109 of Third Embodiment, the flow proceeds to step ST110. In step ST110, the LOS data quantity controller 107 calculates the number of pieces of LOS data using the intended update rate and the update rate of LOS data and outputs the calculation result to the LOS data storage 104b. The LOS data storage 104b determines whether the number of pieces of acquired LOS data reaches the predetermined number on the basis of the number of pieces of LOS data obtained by the LOS data quantity controller 107 (step ST105), and when the predetermined number is reached, outputs the predetermined number of pieces of LOS data. The wind vector calculator 105a calculates a wind vector on the basis of the LOS data output from the LOS data storage 104b (step ST106). On the other hand, when the number of pieces of LOS data does not reach the predetermined number, the LOS data storage 104b stores the LOS data (step ST107), and the flow returns to acquisition processing of next LOS data. That is, the flow returns to step ST101 illustrated in one of FIGS. 4, 6, and 8.

In Fourth Embodiment, it is possible to calculate the wind vector by the intended update rate regardless of the rate of updating the LOS data. Therefore, for example, it is possible to avoid a case in which a motion period and an update rate of the wind vector that is for example three times the rate of updating the LOS data are close to each other and sufficient correction to compensate motion cannot be performed. Sufficient correction cannot be performed when the motion period and the update rate of the wind vector are close to each other, because the original wind vector appears to be always subjected to motion with the constant attitude angle and/or the constant attitude angular velocity.

According to the wind measuring apparatus of Fourth Embodiment, the wind measuring apparatus includes the LOS data quantity controller to calculate the number of pieces of LOS data on the basis of an update rate of the wind vector calculation, and the wind vector calculator is configured to calculate the wind vector by using the LOS data of the number of pieces of LOS data. This enables suppressing degradation of estimation accuracy of the wind vector.

Fifth Embodiment

In Fourth Embodiment, the number of pieces of LOS data used for wind vector calculation is determined in accordance with the predetermined update rate. It is also possible to determine the number of pieces of LOS data such that an intended accuracy of wind speed, that is, an intended accuracy in calculating a wind vector, is satisfied. This is described as Fifth Embodiment.

Figure 11:
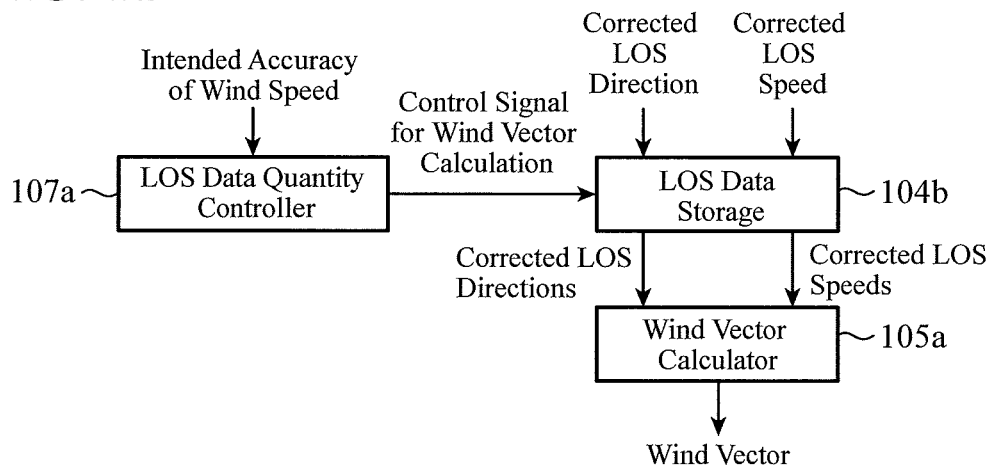
FIG. 11 is a block configuration diagram illustrating the main part of functional parts implemented by a signal processing device according to Fifth Embodiment of this disclosure.

FIG. 11 is a block configuration diagram illustrating the main part of functional parts implemented by a signal processing device 12 according to Fifth Embodiment.

A LOS data quantity controller 107a is a processing part that calculates the number of pieces of LOS data to be used using a preset intended accuracy of wind speed and outputs the calculation result to a LOS data storage 104b. In addition, the LOS data storage 104b is configured to determine whether the acquired number of pieces of LOS data reaches a predetermined number on the basis of the number of pieces of LOS data obtained by the LOS data quantity controller 107a.

Operations of Fifth Embodiment are described.

Figure 12:
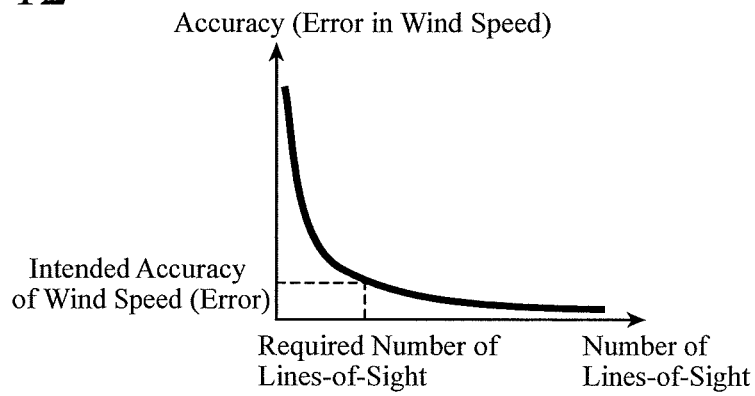
FIG. 12 is an explanatory diagram illustrating the relationship between the number of lines-of-sight and errors in wind speed in a wind measuring apparatus of Fifth Embodiment of this disclosure.

The LOS data quantity controller 107a determines the number of lines-of-sight satisfying the preset intended accuracy of wind speed on the basis of a relationship between the accuracy of wind speed and the number of lines-of-sight acquired in advance, and outputs the determination result to the LOS data storage 104b. FIG. 12 is a diagram illustrating a general relationship between the accuracy of wind speed and the number of lines-of-sight. Such a relationship can be derived empirically, or by using Monte Carlo simulation or examining an error analysis theory, on the basis of both the accuracy per LOS speed and a calculation method in a wind vector calculator 105a. The vertical axis in FIG. 12 illustrates the wind speed error as accuracy. In FIG. 12, setting an intended accuracy of wind speed allows to obtain a required number of lines-of-sight at a point on an axis representing the number of lines-of-sight, the point vertically below an intersection of the value of the accuracy and the characteristic curve.

Figure 13:
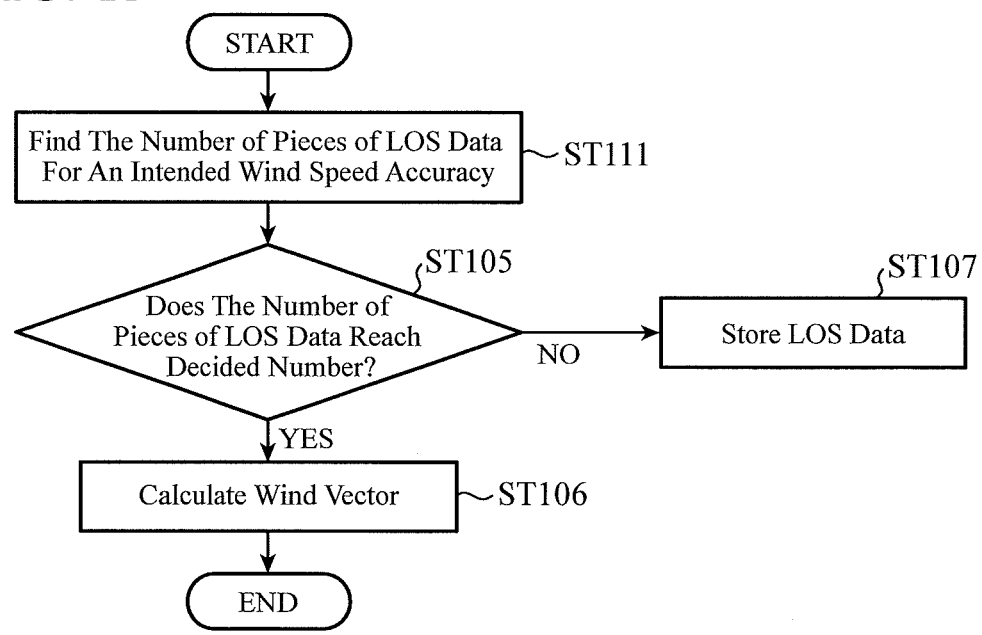
FIG. 13 is a flowchart illustrating operations of the wind measuring apparatus of Fifth Embodiment of this disclosure.

FIG. 13 is a flowchart of a signal processing part of the wind measuring apparatus according to Fifth Embodiment. Also in FIG. 13 illustration of parts common to First to Third Embodiments is omitted. That is, after performing any one set of processing of steps ST101 to ST104 of First Embodiment, steps ST101 to ST108 of Second Embodiment, and steps ST101 to ST109 of Third Embodiment, the flow proceeds to step ST111. In step ST111, the LOS data quantity controller 107a obtains the number of pieces of LOS data for an intended accuracy of wind speed by referring to a relationship acquired in advance between accuracy of wind speed and number of lines-of-sight, and outputs the obtained number to the LOS data storage 104b.

Based on the number of pieces LOS data obtained by the LOS data quantity controller 107a, the LOS data storage 104b determines whether the number of pieces of acquired LOS data reaches the decided number (step ST105), and when the decided number is reached, outputs the decided number of pieces of LOS data. The wind vector calculator 105a calculates a wind vector on the basis of the LOS data output from the LOS data storage 104b (step ST106). On the other hand, when the number of pieces of LOS data does not reach the decided number, the LOS data storage 104b stores the LOS data (step ST107), and the flow returns to acquisition processing of next LOS data. That is, the flow returns to step ST101 illustrated in one of FIGS. 4, 6, and 8.

In Fifth Embodiment, the wind vector can be calculated considering the intended accuracy of wind speed, and thus it is possible to perform wind observation with a predetermined accuracy even in a situation where, for example, it is predicted that the accuracy of wind speed changes depending on the wind state, the state of the atmosphere, the state of the device, or other conditions in the observation environment.

According to the wind measuring apparatus of Fifth Embodiment, further included is the LOS data quantity controller to calculate the number of pieces of LOS data on the basis of a value of an accuracy upon performing the wind vector calculation, and the wind vector calculator calculates the wind vector by using the LOS data of the number of pieces of LOS data. This enables suppressing degradation of estimation accuracy of the wind vector.

Sixth Embodiment

In Fourth and Fifth Embodiments, the number of pieces of LOS data used for wind vector calculation is determined in accordance with a predetermined update rate and an intended accuracy of wind speed, respectively. It is also possible to determine the number of pieces of LOS data such that the effect of correction by considering motion becomes higher on the basis of a motion period of the platform, and this is described as Sixth Embodiment.

Figure 14:
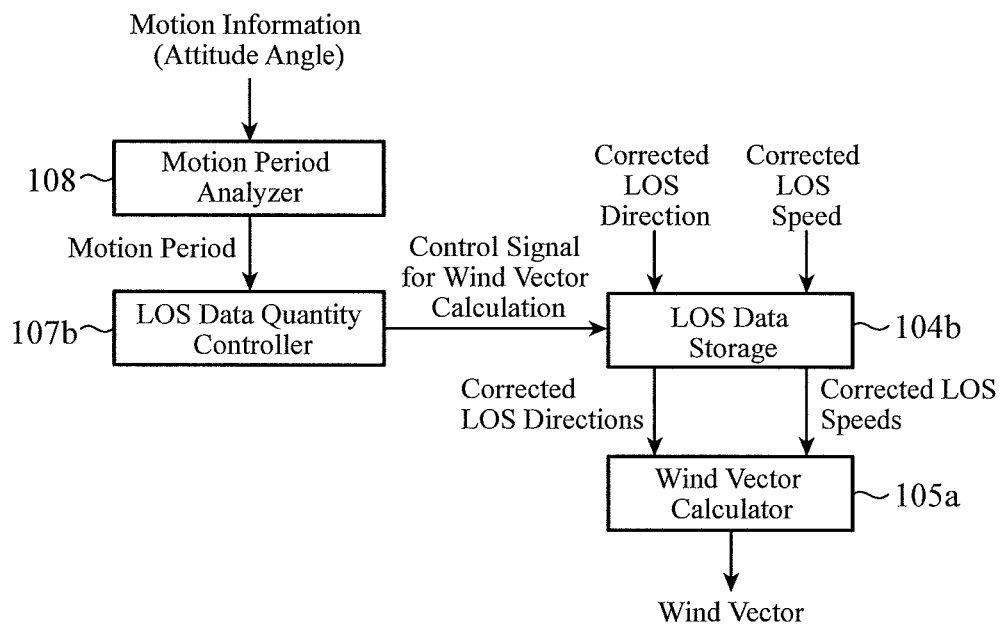
FIG. 14 is a block configuration diagram illustrating the main part of functional parts implemented by a signal processing device according to Sixth Embodiment of this disclosure.

FIG. 14 is a block configuration diagram illustrating the main part of functional parts implemented by a signal processing device according to Sixth Embodiment.

A motion period analyzer 108 is a processing part that performs frequency analysis of motion information to calculate a period or frequency of the motion and outputs the calculation result to a LOS data quantity controller 107b as motion period information. In Sixth Embodiment, attitude angle information is used as the motion information. The LOS data quantity controller 107b is a processing part that calculates the number of pieces of LOS data to be used on the basis of the motion period information output from the motion period analyzer 108, and outputs the LOS data number information to a LOS data storage 104b.

Operations of Sixth Embodiment are described.

Figure 15:
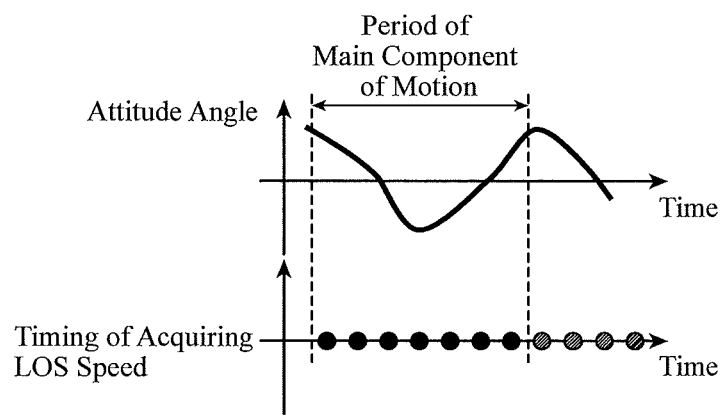
FIG. 15 is an explanatory diagram illustrating the relationship between the motion period and the number of lines-of-sight in a wind measuring apparatus according to Sixth Embodiment of this disclosure.

The motion period analyzer 108 performs frequency analysis by, for example, FFT or other methods by using the attitude angle information output from a motion sensor 10 to obtain a period of the main component of the motion. In a case where the period of the main component of the motion and a calculation rate of a wind vector are equal or close to each other, an effect of correcting the motion is deteriorated. In the LOS data quantity controller 107b, the number of lines-of-sight is determined such that the calculation rate of the wind vector is shifted in terms of time from the motion period of the main component of the motion, for example such that the calculation rate of a wind vector is half the motion period and outputs the number of Lines-of-sight to the LOS data storage 104b. FIG. 15 illustrates the relationship between a motion period and a timing for acquiring the LOS speed. In FIG. 15, in a case where the number of pieces of LOS data is determined so that a time interval of obtaining a LOS data is close to the period of the main component of the motion, the effect of correcting the motion is deteriorated. Therefore, the LOS data quantity controller 107b selects the number of pieces of LOS data whose time interval is not equal to a motion period of the main component of the motion.

Figure 16:
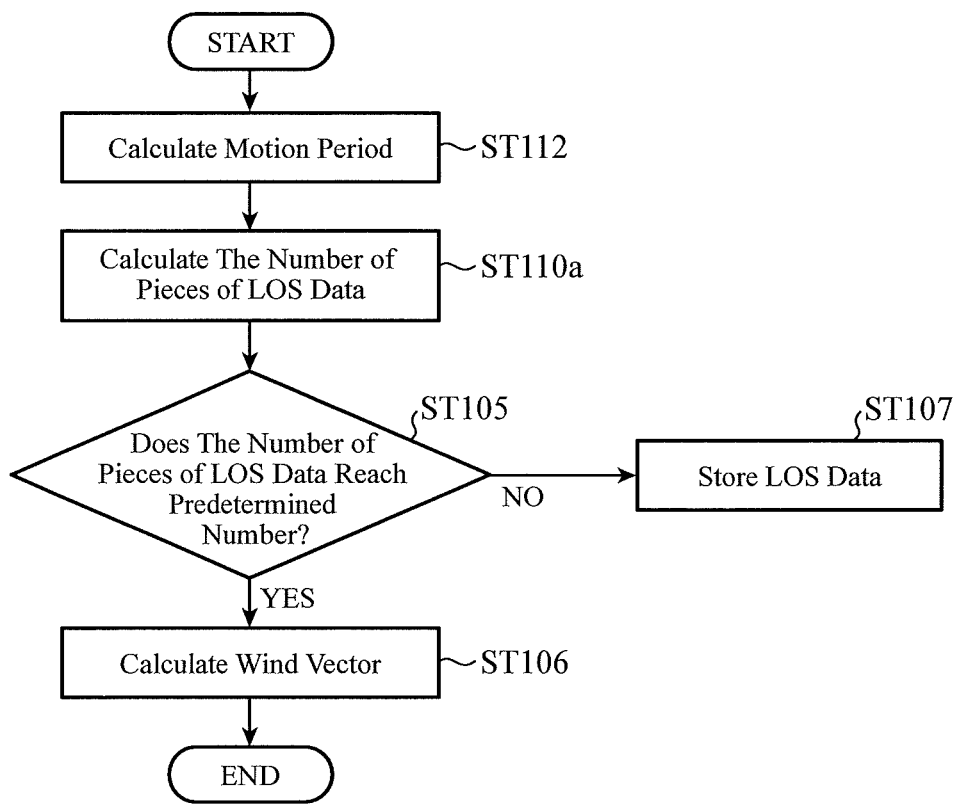
FIG. 16 is a flowchart illustrating operations of the wind measuring apparatus of Sixth Embodiment of this disclosure.

FIG. 16 illustrates a flowchart of a signal processing part of the wind measuring apparatus according to Sixth Embodiment. In FIG. 16, illustration of parts common to the first to Third Embodiments is omitted. That is, after performing any one set of processing of steps ST101 to ST104 of First Embodiment, steps ST101 to ST108 of Second Embodiment, and steps ST101 to ST109 of Third Embodiment, the flow proceeds to step ST112. In step ST112, the motion period analyzer 108 calculates a motion period using attitude angle information. Next, the LOS data quantity controller 107b calculates the number of pieces of LOS data on the basis of the motion period (step ST110a) and outputs the calculation result to the LOS data storage 104b. The LOS data storage 104b determines whether the number of pieces of stored LOS data reaches the predetermined number (step ST105), and when the predetermined number is reached, outputs the predetermined number of pieces of LOS data. The wind vector calculator 105a calculates a wind vector on the basis of the LOS data output from the LOS data storage 104b (step ST106). On the other hand, when the number of pieces of LOS data does not reach the predetermined number, the LOS data storage 104b stores the LOS data (step ST107), and the flow returns to acquisition processing of next LOS data. That is, the flow returns to step ST101 illustrated in one of FIGS. 4, 6, and 8.

In Sixth Embodiment, the wind vector can be calculated considering a period or frequency of motion, and thus it is possible to prevent deterioration of the effect of correction by considering motion due to the motion period and the calculation rate of a wind vector approaching each other.

According to the wind measuring apparatus of Sixth Embodiment, further included are: the motion period analyzer to obtain a motion period of the support object from the attitude angle information detected by the motion sensor; and the LOS data quantity controller to calculate the number of pieces of LOS data on the basis of the motion period obtained by the motion period analyzer, and the wind vector calculator calculates the wind vector by using the LOS data of the number of pieces of the LOS data considering the motion period. This enables suppressing degradation of estimation accuracy of the wind vector.

Seventh Embodiment

In Fourth to Sixth Embodiments, the number of pieces of LOS data used for wind vector calculation is determined in accordance with a predetermined update rate, an intended accuracy of wind speed, and by using a motion period, respectively. It is also possible to determine the number of pieces of LOS data from the spatial arrangement state of measurement points considering an inclination angle, and this is described as Seventh Embodiment.

Figure 17:
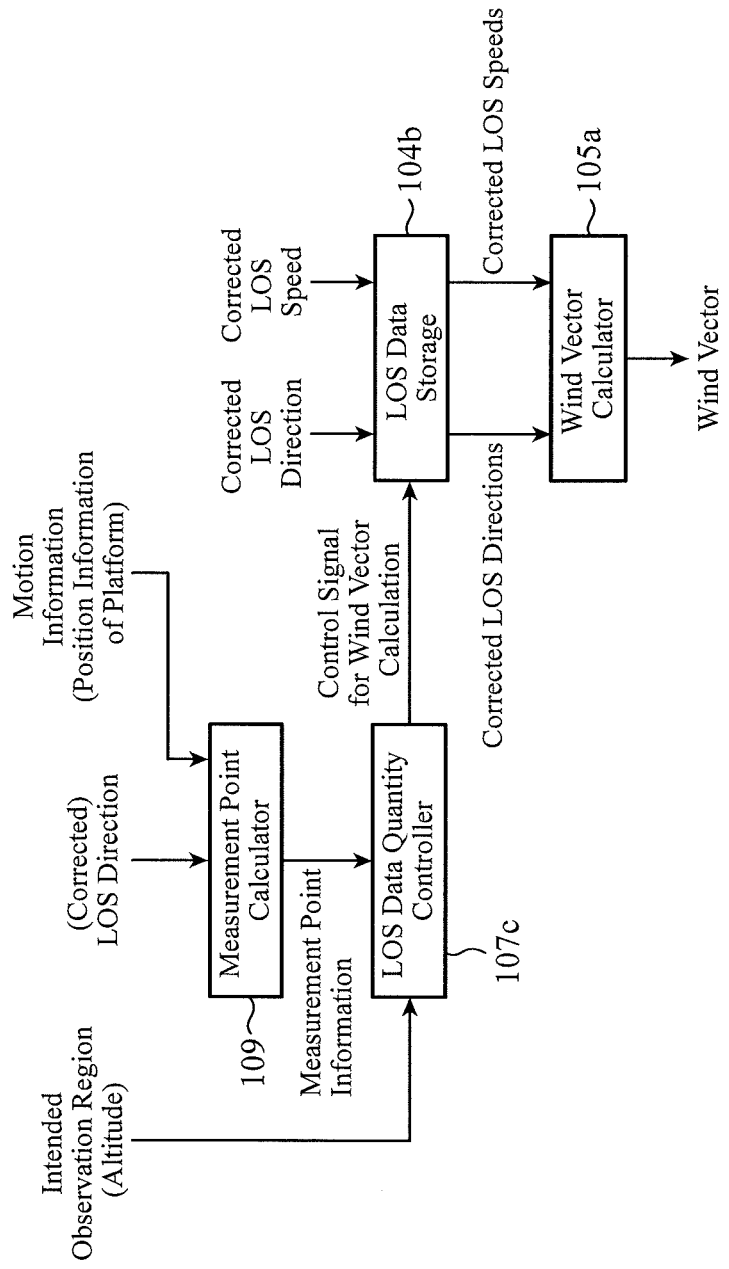
FIG. 17 is a block configuration diagram illustrating the main part of functional parts implemented by a signal processing device according to Seventh Embodiment of this disclosure.

FIG. 17 is a block configuration diagram illustrating the main part of functional parts implemented by the signal processing device 12 according to Seventh Embodiment.

A measurement point calculator 109 is a processing part that calculates a coordinate of a measurement point from a corrected LOS direction and position information of a platform included in motion information and outputs the calculation result to a LOS data quantity controller 107c as measurement point information. The LOS data quantity controller 107c is a processing part that calculates the number of pieces of LOS data to be used using an intended observation region which is a region where the measurement point is intended to be included and the measurement point information from the measurement point calculator 109 and outputs the calculation result to the LOS data storage 104b as a control signal for wind vector calculation. It is assumed that the intended observation region used by the LOS data quantity controller 107c is a region divided by altitude.

Operations of Seventh Embodiment are described.

The measurement point calculator 109 calculates the position of the measurement point actually measured, that is, the azimuth and range (distance) of the measurement point using the corrected LOS direction and the position information of the platform and outputs the calculation result to the LOS data quantity controller 107c as measurement point information. Next, the LOS data quantity controller 107c calculates the spatial spread of measurement points considering the inclination angle using the acquired measurement point information and altitude information acquired in advance. As for the spatial spread, for example, an area of a polygon having vertices each corresponding to the measurement points corrected by considering the inclination angle are compared to a value of a predetermined area. When the area of the polygon is larger than or equal to the determined area, it is expected to be determined that there is sufficient spread for calculating a wind vector. Furthermore, for example in a case where an angle representing the spread of measurement points with respect to a reference point such as the center of the measurement point in a state without motion is larger than or equal to a predetermined value, it can be determined that there is sufficient spread and that a wind vector can be calculated. The angle representing the spread of the measurement points is, for example, an interior angle at a vertex corresponding to the reference point of a polygon having vertices being the reference point and the measurement points.

Figure 18:
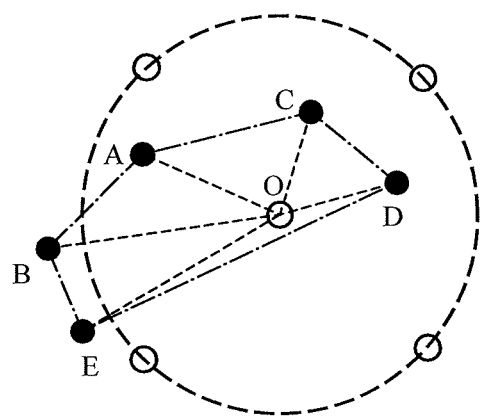
FIG. 18 is an explanatory diagram schematically illustrating measurement points of LOS speed in a wind measuring apparatus according to Seventh Embodiment of this disclosure.

FIG. 18 is a view of an observation region when viewed from vertically above. Here, ○ (open circle) represents a measurement point of LOS speed in a state without motion, and points A to E indicated by ● (black dot) represents a measurement point of LOS speed in a state with motion. In FIG. 18, the sum of angle DOC, angle COA, angle AOB, angle BOE, and angle EOD is obtained as the angle representing the spread of measurement points, and when the sum is equal to or larger than a determined value, it is determined that there is sufficient spread. Generally, a correct wind vector can be calculated when the angle is equal to or more than 180 degrees. In a case where it is determined that there is sufficient spread in the LOS data quantity controller 107c, the information of the number of Lines-of-sight is output to the LOS data storage 104b as a control signal for wind vector calculation. When it cannot be determined that there is sufficient spread, LOS speed data is sequentially increased and the same determination is repeated. It is also possible to use an altitude distribution instead of or in addition to the spatial spread of the measurement points and thereby determining whether the measurement points can be assumed to be substantially in the same altitude or not. In general, a wind velocity has different distributions for each altitude. Therefore, when the motion of the platform causes the tilt of the platform, and a difference in altitude between measurement points is generated, different wind speeds are measured at those observation points, thereby deteriorating the accuracy of wind measurement. In such a case, it is possible to use only LOS speeds of measurement points at the same altitude. It is also possible to obtain measurement points of the same altitude by changing a distance to calculate the LOS speed in the lidar, that is, the range of the received signal to calculate the LOS speed of altitude.

Figure 19:
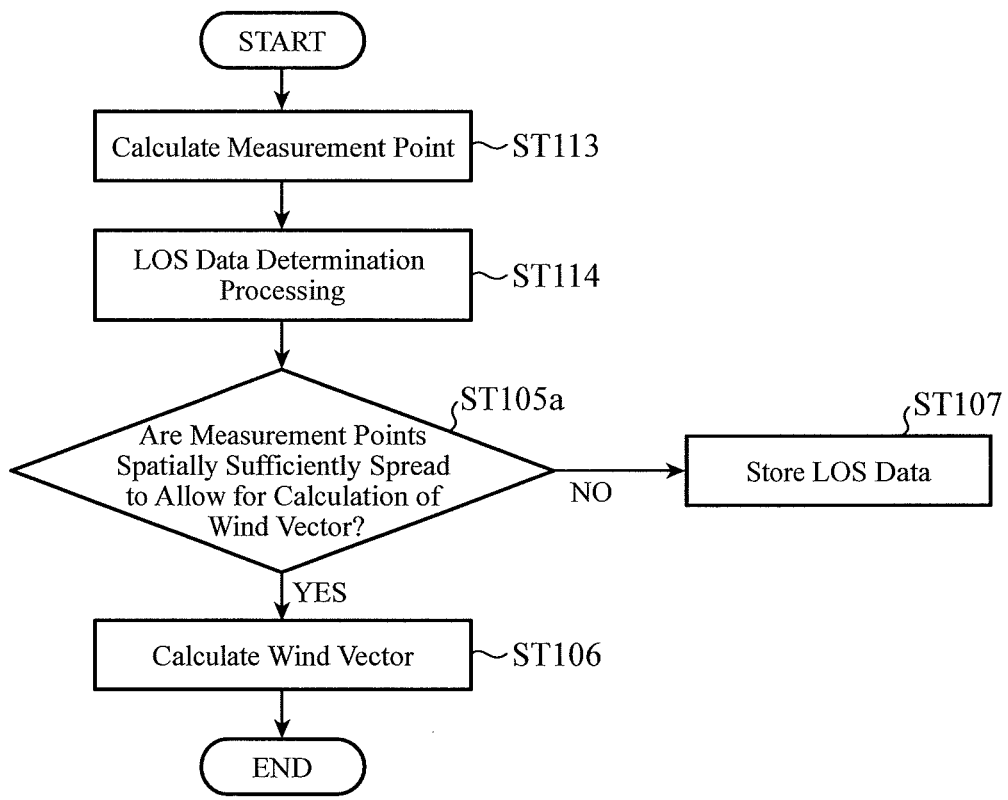
FIG. 19 is a flowchart illustrating operations of the wind measuring apparatus of Seventh Embodiment of this disclosure.

FIG. 19 illustrates a flowchart of a signal processing part of the wind measuring apparatus according to Seventh Embodiment. In FIG. 19 illustration of parts common to First to Third Embodiments is omitted. That is, after performing any one set of processing of steps ST101 to ST104 of First Embodiment, steps ST101 to ST108 of Second Embodiment, and steps ST101 to ST109 of Third Embodiment, the flow proceeds to step ST113. In step ST113, the measurement point calculator 109 calculates a measurement point considering an inclination angle. Next, the LOS data quantity controller 107c determines whether the measurement points are spatially sufficiently spread (step ST114), and when they are sufficiently spread, a control signal for wind vector calculation indicating that a wind vector can be calculated is output to the LOS data storage 104b. The LOS data storage 104b determines whether a wind vector can be calculated on the basis of the control signal for wind vector calculation from the LOS data quantity controller 107c (step ST105 a) and, when a wind vector can be calculated, outputs LOS data. The wind vector calculator 105a calculates a wind vector on the basis of the LOS data acquired from the LOS data storage 104b (step ST106). On the other hand, when the number of pieces of LOS data does not reach the predetermined number, the LOS data storage 104b stores the LOS data (step ST107), and the flow returns to acquisition processing of next LOS data. That is, the flow returns to step ST101 illustrated in one of FIGS. 4, 6, and 8.

In Seventh Embodiment, a wind vector can be calculated by determining whether measurement points are valid or invalid on the basis of the spatial spread of the measurement points. In the determination of the validity of measurement points, the inclination angle or whether being in the same altitude distribution is considered, and thus estimation of a wind vector with high accuracy is possible even in a case where the measurement points vary due to the motion.

According to the wind measuring apparatus of Seventh Embodiment, the wind measuring apparatus includes the measurement point calculator and the LOS data quantity controller. The measurement point calculator obtains measurement point information indicating positions of the measurement point at which the wind vector is calculated. The LOS data quantity controller obtains a spatial arrangement state of the measurement points from the measurement point information and information of an observation region for which the wind vector is calculated and calculates the number of pieces of LOS data on the basis of the spatial arrangement state of the measurement points. The wind vector calculator is configured to calculate the wind vector by using the LOS data of the number of pieces of the LOS data considering the spatial arrangement state of the measurement point. This enables suppressing degradation of estimation accuracy of the wind vector.

Eighth Embodiment

In Seventh Embodiment, the number of pieces of LOS data used to calculate a wind vector is determined from the spatial arrangement state of measurement points considering the inclination angle. It is also possible to determine the number of pieces of LOS data such that the effect of correction by considering motion is enhanced, on the basis of the state of a change from the wind at the time of a previous observation, for example, the last observation, which is described as Eighth Embodiment.

Figure 20:
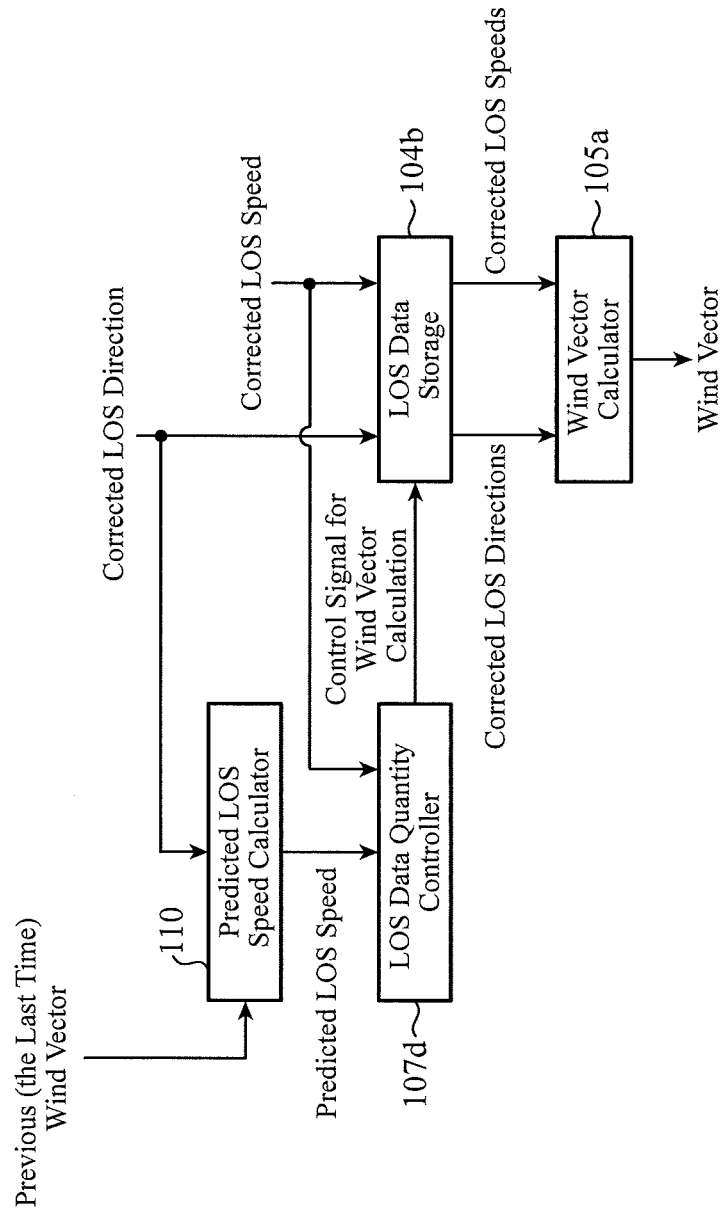
FIG. 20 is a block configuration diagram illustrating the main part of functional parts implemented by a signal processing device according to Eighth Embodiment of this disclosure.

FIG. 20 is a block configuration diagram illustrating the main part of functional parts implemented by a signal processing device 12 according to Eighth Embodiment.

A predicted LOS speed calculator 110 is a processing part that calculates a currently predicted LOS speed using a wind vector at the time of observation in the past and a corrected LOS direction and outputs the calculation result to a LOS data quantity controller 107d. The LOS data quantity controller 107d determines the wind state, for example, a change in a wind direction, using the predicted LOS speed and a corrected LOS speed actually measured to calculate the number of pieces of LOS data to be used and outputs the calculation result to the LOS data storage 104b.

Operations of Eighth Embodiment are described.

The predicted LOS speed calculator 110 calculates the predicted LOS speed, which is the LOS speed under the assumption in that the current wind state (wind direction and wind speed) is not changed, to be an inner product of the wind vector at the last observation and the corrected LOS direction. The predicted LOS speed calculator 110 outputs the calculation result to the LOS data quantity controller 107d.

The LOS data quantity controller 107d compares the predicted LOS speed with the corrected LOS speed actually measured and, when the difference is less than a predetermined value, determines that the wind state does not change and that LOS data used for wind vector calculation can be increased. When the difference is equal to or larger than the predetermined value, it is determined that the wind state changes from the last observation and that the accuracy is deteriorated when the wind vector is calculated by including the current LOS speed, and thus the number of pieces of LOS data to be used is output to the LOS data storage 104b.

Figure 21:
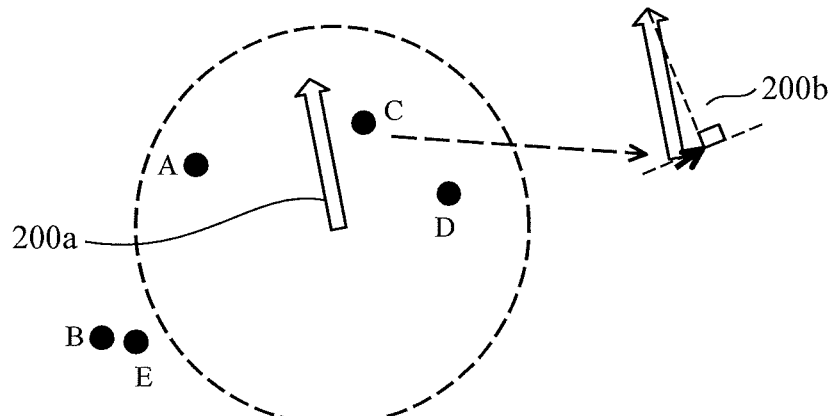
FIG. 21 is an explanatory diagram illustrating the relationship between previous wind vectors and measurement points of LOS speed in a wind measuring apparatus according to Eighth Embodiment of this disclosure.

FIG. 21 is a schematic diagram illustrating the relationship between wind vectors in the past and measurement points. FIG. 21 is a view of an observation region when viewed from vertically above. Each of points A to E represented by ● (black dot) represent a measurement point of LOS speed in a state with motion. In addition, 200a indicates a wind vector in the past, and 200b indicates a predicted LOS speed.

Figure 22:
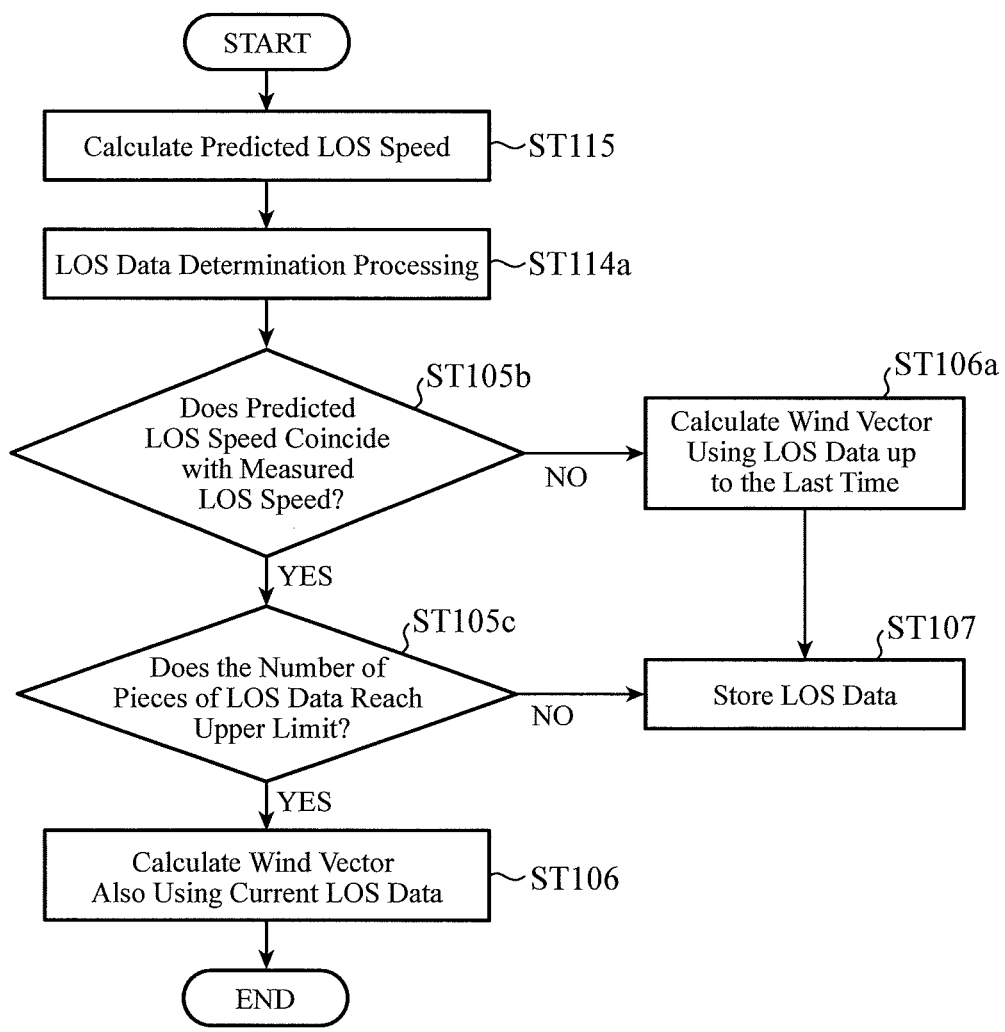
FIG. 22 is a flowchart illustrating operations of the wind measuring apparatus according to Eighth Embodiment of this disclosure.

FIG. 22 illustrates a flowchart of a signal processing part of the wind measuring apparatus according to Eighth Embodiment. In FIG. 22, illustration of parts common to First to Third Embodiments is omitted. That is, after performing any one set of processing of steps ST101 to ST104 of First Embodiment, steps ST101 to ST108 of Second Embodiment, and steps ST101 to ST109 of Third Embodiment, the flow proceeds to step ST115. In step ST115, the predicted LOS speed calculator 110 calculates a predicted LOS speed. Next, the LOS data quantity controller 107d determines the degree of coincidence between the predicted LOS speed and the measured LOS speed (step ST114a) and outputs, as a control signal for wind vector calculation, whether the degree of coincidence is equal to or larger than a predetermined value. On the basis of the control signal for wind vector calculation obtained by the LOS data quantity controller 107a, the LOS data storage 104b determines whether the predicted LOS speed coincides with the measured LOS speed (step ST105b) and, when the predicted LOS speed coincides with the measured LOS speed, determines whether the number of pieces of LOS data reaches an upper limit (step ST105c). The upper limit of the number of pieces of LOS data is determined from a time interval at which a wind vector is calculated even in a case where a state in which there is no change in the wind velocity continues. When the number of pieces of LOS data reaches the upper limit, a wind vector is calculated using also the current LOS data (step ST106). When the number of pieces of LOS data does not reach the upper limit, the LOS data is stored (step ST107), and the flow returns to acquisition processing of the next LOS data. That is, the flow returns to step ST101 illustrated in one of FIGS. 4, 6, and 8. When the predicted LOS speed does not coincide with the measured LOS speed, the wind state changes, and thus a wind vector is calculated using the LOS data up to the last time (step ST106a). The current LOS data is stored (step ST107), and the flow returns to acquisition processing of the next LOS data.

In Eighth Embodiment, the number of pieces of LOS data used in wind vector calculation is changed in accordance with a change in the wind state, and thus a noise component can be reduced when the wind state is stable, and deterioration of estimation accuracy of a wind vector can be suppressed even when the wind state changes.

According to the wind measuring apparatus of Eighth Embodiment, further included are: the predicted LOS speed calculator to obtain a predicted LOS speed from a past calculation result of a wind vector; and the LOS data quantity controller to calculate the number of pieces of LOS data by comparing the predicted LOS speed and a measured LOS speed, and the wind vector calculator calculates the wind vector using the LOS data of the number of pieces of LOS data calculated by comparison between the predicted LOS speed and a measured LOS speed. This enables suppressing degradation of prediction accuracy of the wind vector.

Ninth Embodiment

In Eighth Embodiment, the number of pieces of LOS data used in wind vector calculation is changed in accordance with a change in the wind state. However, the number of pieces of LOS data can be determined in accordance with the motion state, which is described as Ninth Embodiment.

Figure 23:
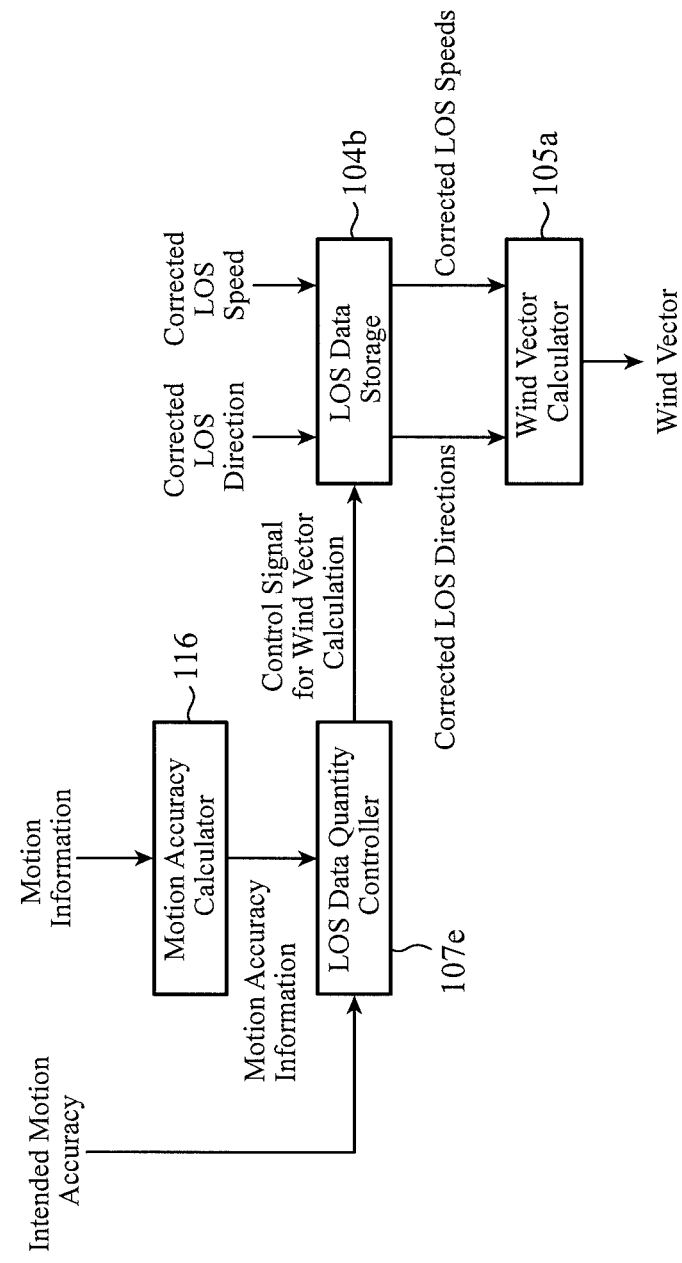
FIG. 23 is a block configuration diagram illustrating the main part of functional parts implemented by a signal processing device according to Ninth Embodiment of this disclosure.

FIG. 23 is a block configuration diagram illustrating the main part of functional parts implemented by a signal processing device according to Ninth Embodiment.

A motion accuracy calculator 116 is a processing part that calculates the accuracy of motion information and outputs the calculation result to a LOS data quantity controller 107e. The LOS data quantity controller 107e is a processing part that calculates the number of pieces of LOS data to be used by using the motion accuracy information obtained by the motion accuracy calculator 116 and outputs the calculation result to the LOS data storage 104b as a control signal for wind vector calculation.

Operations of Ninth Embodiment are described.

The motion accuracy calculator 116 calculates statistics such as an average value, a variance value, or a standard deviation from motion information output from a motion sensor 10, and outputs the motion accuracy information to the LOS data quantity controller 107e.

Figure 24:
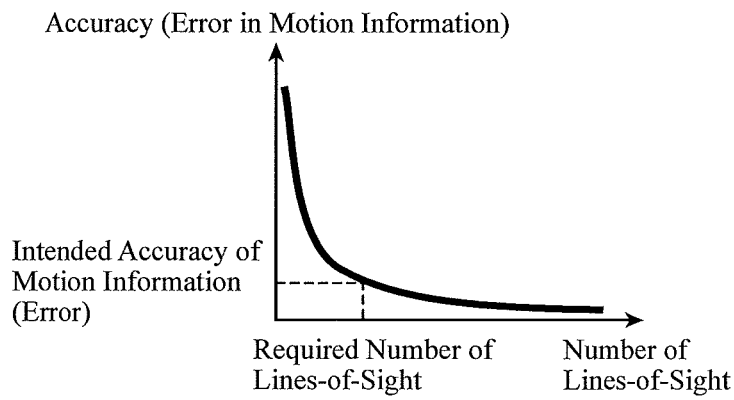
FIG. 24 is an explanatory diagram illustrating the relationship between errors in motion information and the number of lines-of-sight in a wind measuring apparatus of Ninth Embodiment of this disclosure.

The LOS data quantity controller 107e compares an intended motion accuracy and the motion accuracy information obtained by the motion accuracy calculator 116 and, when the measured accuracy of motion is better than the intended motion accuracy, outputs the current number of pieces of LOS data continuously. When the measured accuracy of motion is worse, an increased number of pieces of LOS data are output in order to mitigate noise components by increasing the number of pieces of LOS data. FIG. 24 is a diagram illustrating the relationship between the motion accuracy and the number of lines-of-sight. In a case where an error component of motion is caused by noise, this can be reduced by increasing the number of lines-of-sight. The characteristic of the motion accuracy and the number of lines-of-sight illustrated in FIG. 24 is obtained in advance.

Figure 25:
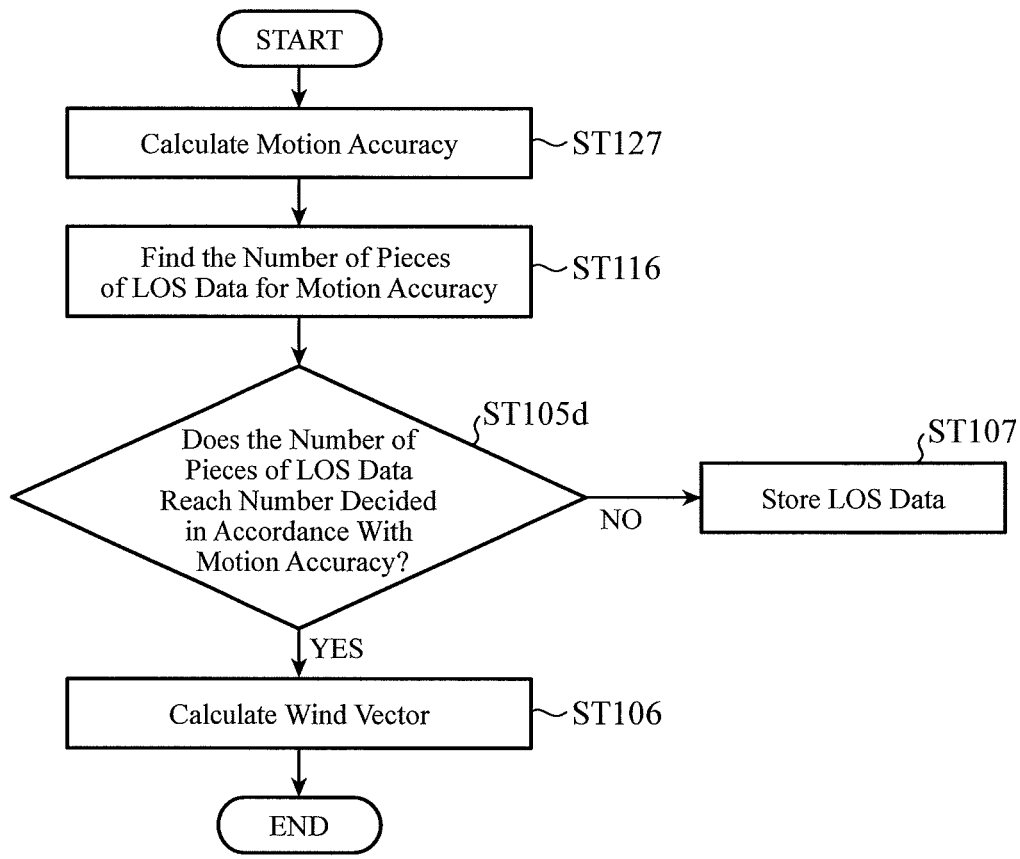
FIG. 25 is a flowchart illustrating operations of the wind measuring apparatus of Ninth Embodiment of this disclosure.

FIG. 25 illustrates a flowchart of a signal processing part of the wind measuring apparatus according to Ninth Embodiment. In FIG. 25, illustration of parts common to First to Third Embodiments is omitted. That is, after performing any one set of processing of steps ST101 to ST104 of First Embodiment, steps ST101 to ST108 of Second Embodiment, and steps ST101 to ST109 of Third Embodiment, the flow proceeds to step ST127. In step ST127, the motion accuracy calculator 116 calculates a motion accuracy. Next, the LOS data quantity controller 107e decides the number of pieces of LOS data for the motion accuracy by referring to the characteristic acquired in advance between motion accuracy and number of pieces of LOS data (step ST116), and outputs the determination result as a control signal for wind vector calculation. Based on the number of pieces LOS data obtained by the LOS data quantity controller 107e, the LOS data storage 104b determines whether the number of pieces of acquired LOS data reaches the number decided in accordance with the motion accuracy (step ST105d). If the number decided in accordance with the motion accuracy is reached, the LOS data storage 104b outputs the LOS data of number of pieces decided in accordance with the motion accuracy. The wind vector calculator 105a calculates a wind vector on the basis of the LOS data acquired from the LOS data storage 104b (step ST106). On the other hand, when the number of pieces of LOS data does not reach the number decided in accordance with the motion accuracy, the LOS data storage 104b stores the LOS data (step ST107), and the flow returns to acquisition processing of next LOS data. That is, the flow returns to step ST101 illustrated in one of FIGS. 4, 6, and 8.

In Ninth Embodiment, the number of pieces of LOS data used in wind vector calculation is changed in accordance with the motion accuracy, it is possible to estimate a wind vector with a high accuracy even when the motion state changes to cause an increase of randomness.

According to the wind measuring apparatus of Ninth Embodiment, further included are: the motion accuracy calculator to obtain an accuracy of the motion information from a statistic of the motion information; and the LOS data quantity controller to calculate the number of pieces of LOS data from the accuracy of the motion information. The wind vector calculator calculates the wind vector by using the LOS data of the number of pieces of the LOS data. The number of pieces of the LOS data is determined by considering the accuracy of the motion information. This enables suppressing degradation of estimation accuracy of the wind vector.

Tenth Embodiment

In Fifth and Ninth Embodiments, the number of pieces of LOS data used in the wind vector estimation is changed in accordance with the accuracy of LOS speed and the accuracy of motion information, respectively. However, for example, in a case where a hard target such as a bird or an airplane appears in an observation region, the accuracy of LOS speed may be locally deteriorated. In such a case, it is more effective to determine whether to use LOS data individually instead of controlling the number of pieces of the LOS data, which is described as Tenth Embodiment.

Figure 26:
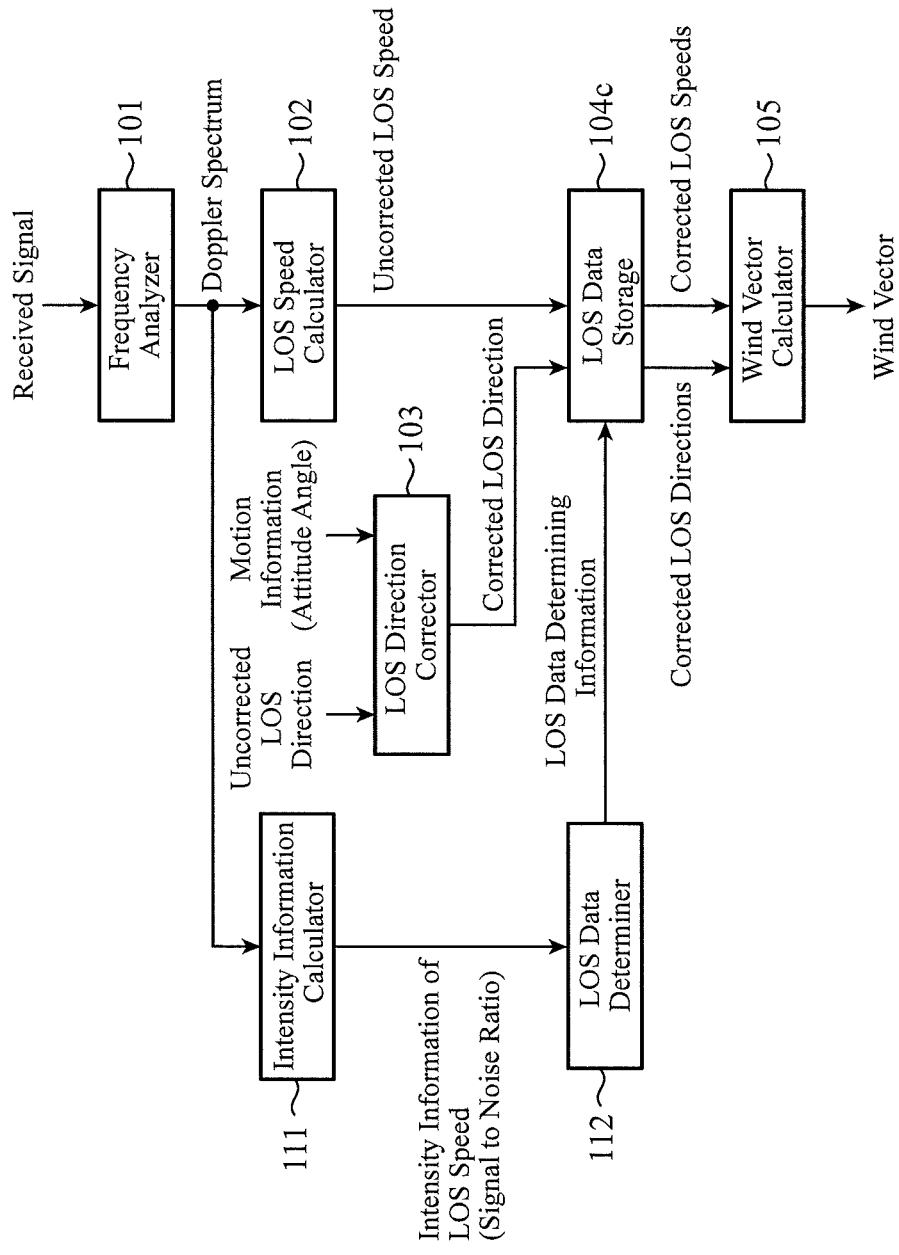
FIG. 26 is a block configuration diagram illustrating functional parts implemented by a signal processing device according to Tenth Embodiment of this disclosure.

FIG. 26 is a block configuration diagram illustrating functional parts implemented by a signal processing device 12 in Tenth Embodiment.

An intensity information calculator 111 is a processing part that calculates signal intensity information from a Doppler spectrum of a received signal and outputs the calculation result to a LOS data determiner 112. The LOS data determiner 112 is a processing part that determines whether LOS data is valid on the basis of the acquired intensity information of the received signal and outputs the determination result to a LOS data storage 104c.

Operations of Tenth Embodiment are described.

The intensity information calculator 111 performs peak detection using the Doppler spectrum of the received signal and calculates an amplitude value. The amplitude value is an indicator indicating the intensity of the signal, which can be used as LOS speed intensity information. Alternatively, a signal to noise ratio may be calculated as a ratio of the amplitude value against a noise level obtained in advance, to be used as the LOS speed intensity information.

The LOS data determiner 112 determines whether a value of the acquired LOS speed intensity information is within a predetermined range to be valid for the wind speed. The predetermined range is acquired and set in advance. For example, when an intensity exceeds the range, there is a high possibility of a reflection wave from a hard target. Conversely, when an intensity is lower than the range, there are possibilities that the aerosol concentration is low, and thus the reliability as data is low or that rapid and large motion causes large variations of velocity within a measurement time, and thus signals are not accumulated. In a case where the intensity is within a predetermined range, LOS data determining information indicating the validity of the data is output to the LOS data storage 104c. In a case where the intensity is outside the predetermined range, LOS data determining information indicating the invalidity of the LOS data is output to the LOS data storage 104c. The LOS data storage 104c outputs only the LOS data determined to be valid to a wind vector calculator 105.

Figure 27:
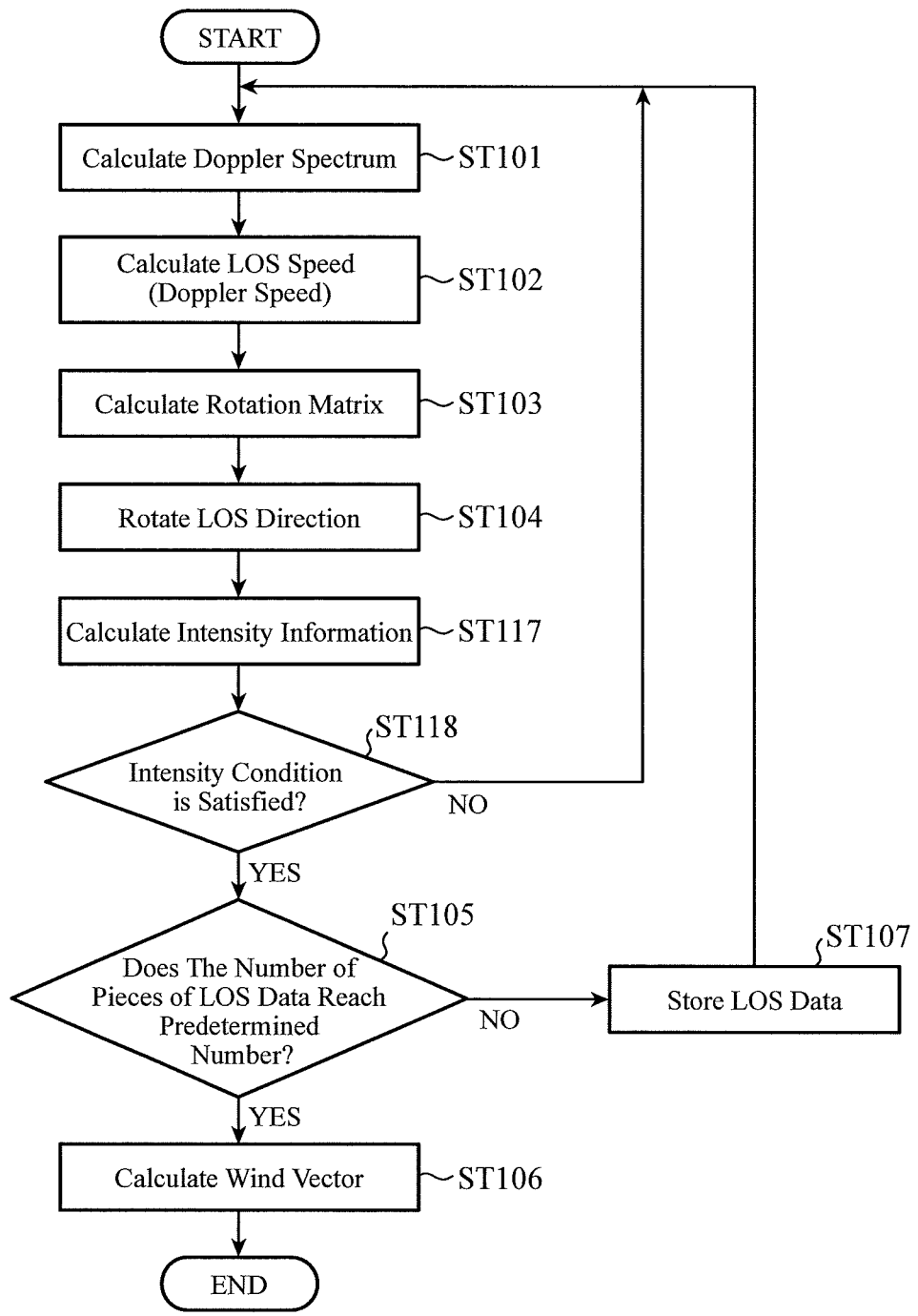
FIG. 27 is a flowchart illustrating operations of a wind measuring apparatus of Tenth Embodiment of this disclosure.

FIG. 27 illustrates a flowchart of a signal processing part of the wind measuring apparatus according to Tenth Embodiment. In FIG. 27, steps ST101 to ST104 are same as those of First to Third Embodiments, and thus descriptions thereof are omitted.

In Tenth Embodiment, the LOS direction corrector 103 rotates a LOS direction (step ST104), and the intensity information calculator 111 calculates the intensity information from the Doppler spectrum (step ST117). Next, the LOS data determiner 112 determines whether the intensity information calculated by the intensity information calculator 111 satisfies a predetermined condition (step ST118). When the condition is satisfied, the LOS data determining information indicating the validity of the LOS data is output. When the intensity does not satisfy the predetermined condition, the LOS data determining information indicating the invalidity of the LOS data is output. The LOS data storage 104c determines whether the number of pieces of valid LOS data among the acquired LOS data reaches a predetermined number on the basis of the LOS data determining information (step ST105). When the predetermined number is reached, the predetermined number of valid LOS data is output. The wind vector calculator 105 calculates a wind vector on the basis of the LOS data acquired from the LOS data storage 104c (step ST106). On the other hand, when the number of pieces of valid LOS data does not reach the predetermined number, the LOS data storage 104c stores the LOS data (step ST107), and the flow returns to step ST101. Moreover, when the intensity information does not satisfy the predetermined condition, the LOS data is discarded in step ST118, and the flow returns to step ST101.

In Tenth Embodiment, whether the data is valid is determined on the basis of the intensity condition of the LOS data, and thus it is possible to measure a wind vector using only valid data, that is, highly accurate data. Thus a high wind vector estimation accuracy can be obtained.

According to the wind measuring apparatus of Tenth Embodiment, further included are: an intensity information calculator to calculate intensity information of the received signal received by the signal transmitter/receiver; and a LOS data determiner to determine that the LOS data calculated from the received signal is valid in a case where a value of the intensity information satisfies a predetermined condition, and the wind vector calculator calculates the wind vector using the LOS data determined to be valid in the LOS data determiner. This enables suppressing degradation of estimation accuracy of the wind vector.

Eleventh Embodiment

In Tenth Embodiment, validity is determined on the basis of the intensity condition of the LOS data. It is also possible to determine using a value of the Doppler speed, which is described as Eleventh Embodiment.

Figure 28:
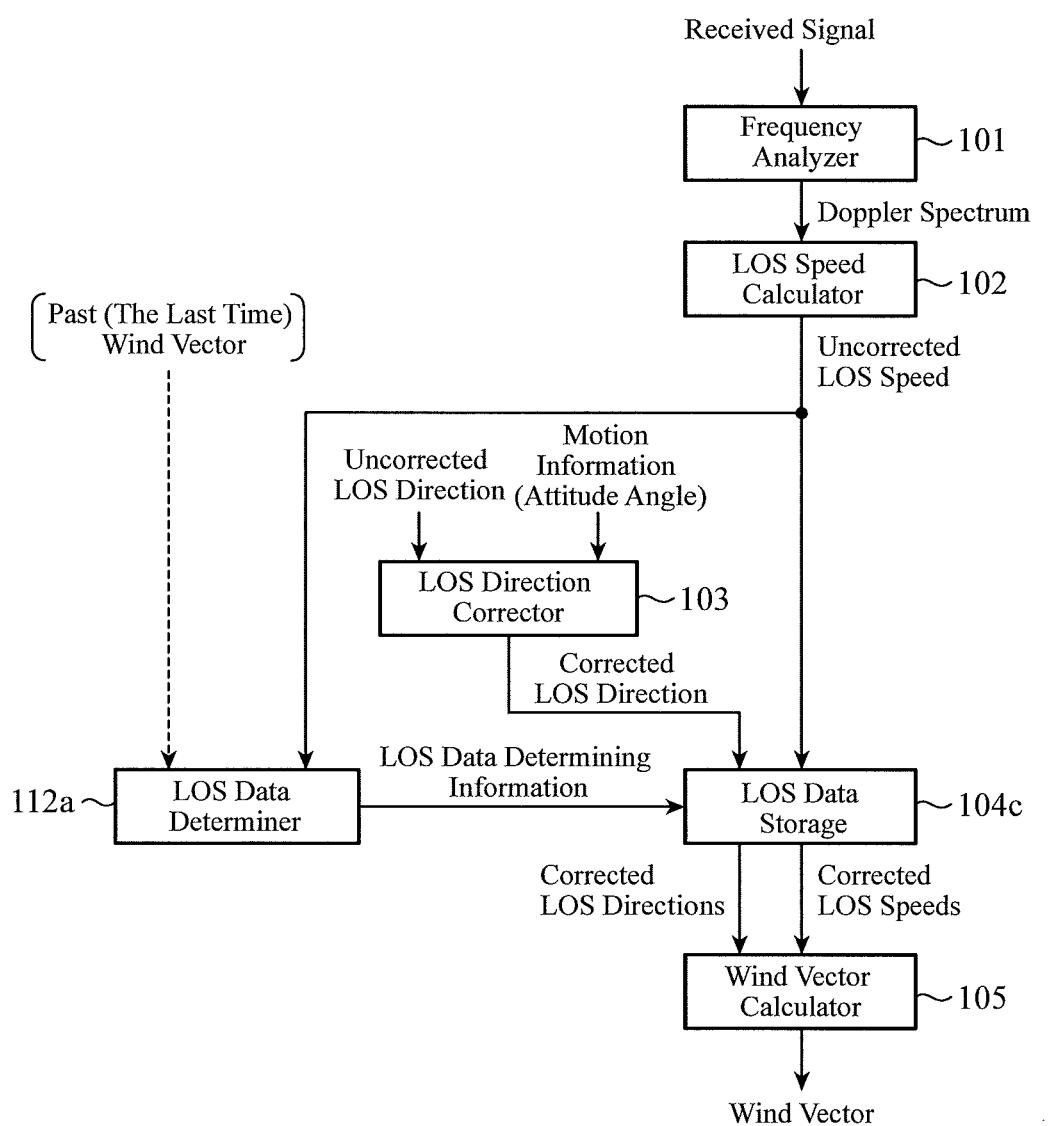
FIG. 28 is a block configuration diagram illustrating functional parts implemented by a signal processing device according to Eleventh Embodiment of this disclosure.

FIG. 28 is a block configuration diagram illustrating functional parts implemented by the signal processing device 12 according to Eleventh Embodiment.

A LOS data determiner 112a is a processing part that determines whether LOS data is valid on the basis of an acquired LOS speed and outputs the determination result to a LOS data storage 104c.

Operations of Eleventh Embodiment are described.

The LOS data determiner 112a determines whether a value of the LOS speed is within a predetermined range to be valid for the wind speed on the basis of an uncorrected LOS speed calculated by the LOS speed calculator 102. For example, when the Doppler speed is high and outside the valid predetermined range, a noise component may be erroneously estimated. Furthermore, in a case where a comparison is made with a wind vector in the past, for example, at the last time, and the difference is large, the LOS speed may also be erroneously estimated. When the value of the LOS speed is valid, LOS data determining information indicating that the LOS data is valid is output to the LOS data storage 104c. When the value of the LOS speed is invalid, LOS data determining information indicating that the LOS data is invalid is output to the LOS data storage 104c.

Figure 29:
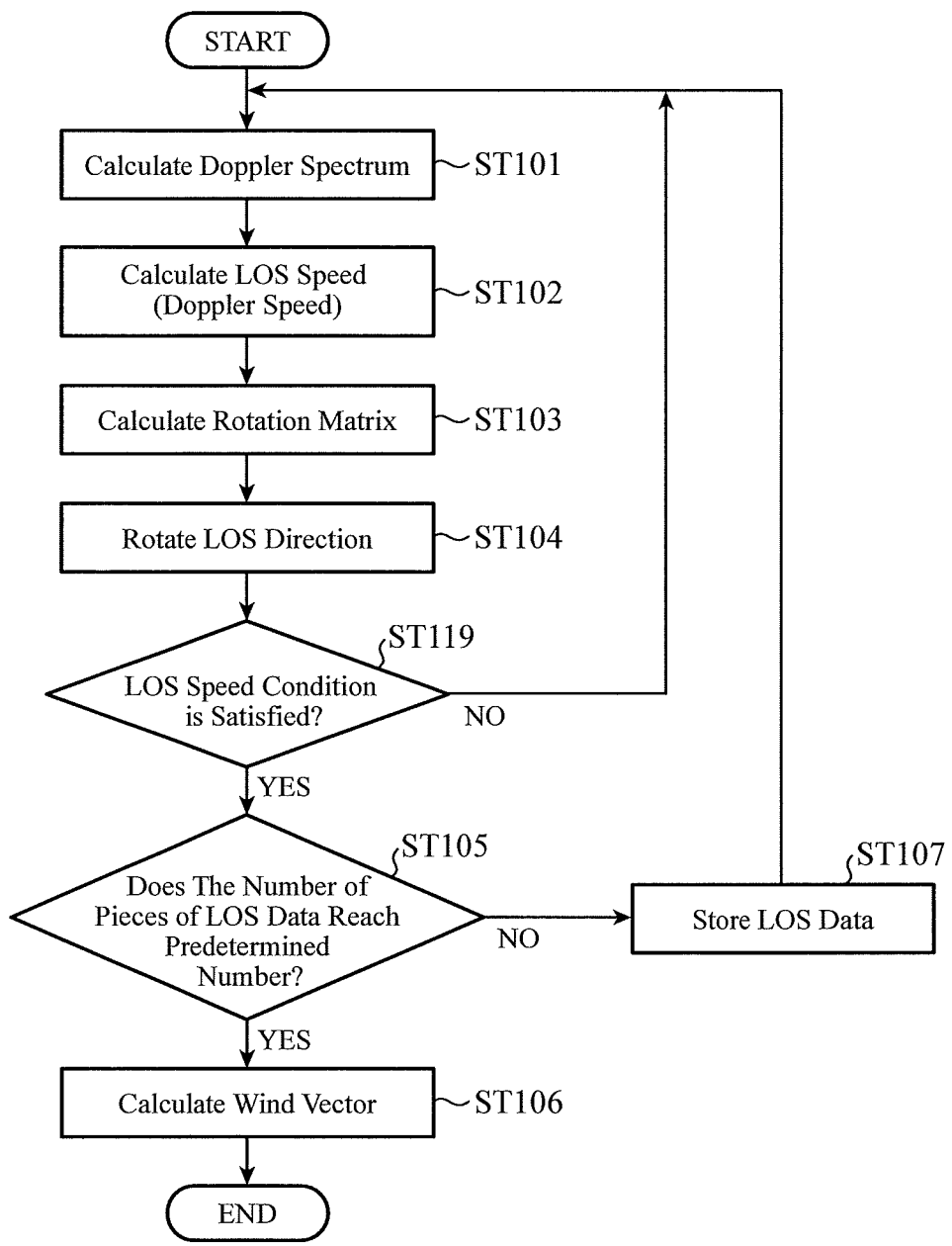
FIG. 29 is a flowchart illustrating operations of a wind measuring apparatus of Eleventh Embodiment of this disclosure.

FIG. 29 illustrates a flowchart of a signal processing part of the wind measuring apparatus according to Eleventh Embodiment. In FIG. 29, steps ST101 to ST104 are same as those of First to Third Embodiments, and thus descriptions thereof are omitted.

In Eleventh Embodiment, the LOS direction corrector 103 rotates the LOS direction (step ST104), and the LOS data determiner 112a determines whether the uncorrected LOS speed obtained by the LOS speed calculator 102 satisfies a predetermined condition (step ST119). When the condition is satisfied, LOS data determining information indicating the validity of the LOS data is output. When an intensity does not satisfy the predetermined condition, LOS data determining information indicating the invalidity of the LOS data is output. The LOS data storage 104c determines whether the number of pieces of valid LOS data among the acquired LOS data reaches a predetermined number on the basis of the LOS data determining information (step ST105). When the predetermined number is reached, the predetermined number of valid LOS data is output. The wind vector calculator 105 calculates a wind vector on the basis of the LOS data acquired from the LOS data storage 104c (step ST106). On the other hand, when the number of pieces of valid LOS data does not reach the predetermined number, the LOS data storage 104c stores the LOS data (step ST107), and the flow returns to step ST101. Moreover, when the LOS speed does not satisfy the predetermined condition, the LOS data is discarded in step ST119, and the flow returns to step ST101.

In Eleventh Embodiment, whether the data is valid is determined on the basis of the condition related to Doppler speed of the LOS data, and thus it is possible to measure a wind vector using only valid data, that is, highly accurate data. Thus, a high accuracy of wind vector estimation can be obtained.

According to the wind measuring apparatus of Eleventh Embodiment, further included is: a LOS data determiner to determine that the LOS data of the LOS speed is valid in a case where the LOS speed obtained by the LOS speed calculator satisfies a predetermined condition. The wind vector calculator calculates the wind vector using the LOS data determined to be valid in the LOS data determiner. This enables suppressing degradation of estimation accuracy of the wind vector.

Twelfth Embodiment

In Tenth Embodiment and Eleventh Embodiment, the validity of the LOS data is determined on the basis of a value of the intensity and the LOS speed of the LOS data, respectively. It is also possible to perform the determination by using motion information, which is described as Twelfth Embodiment.

Figure 30:
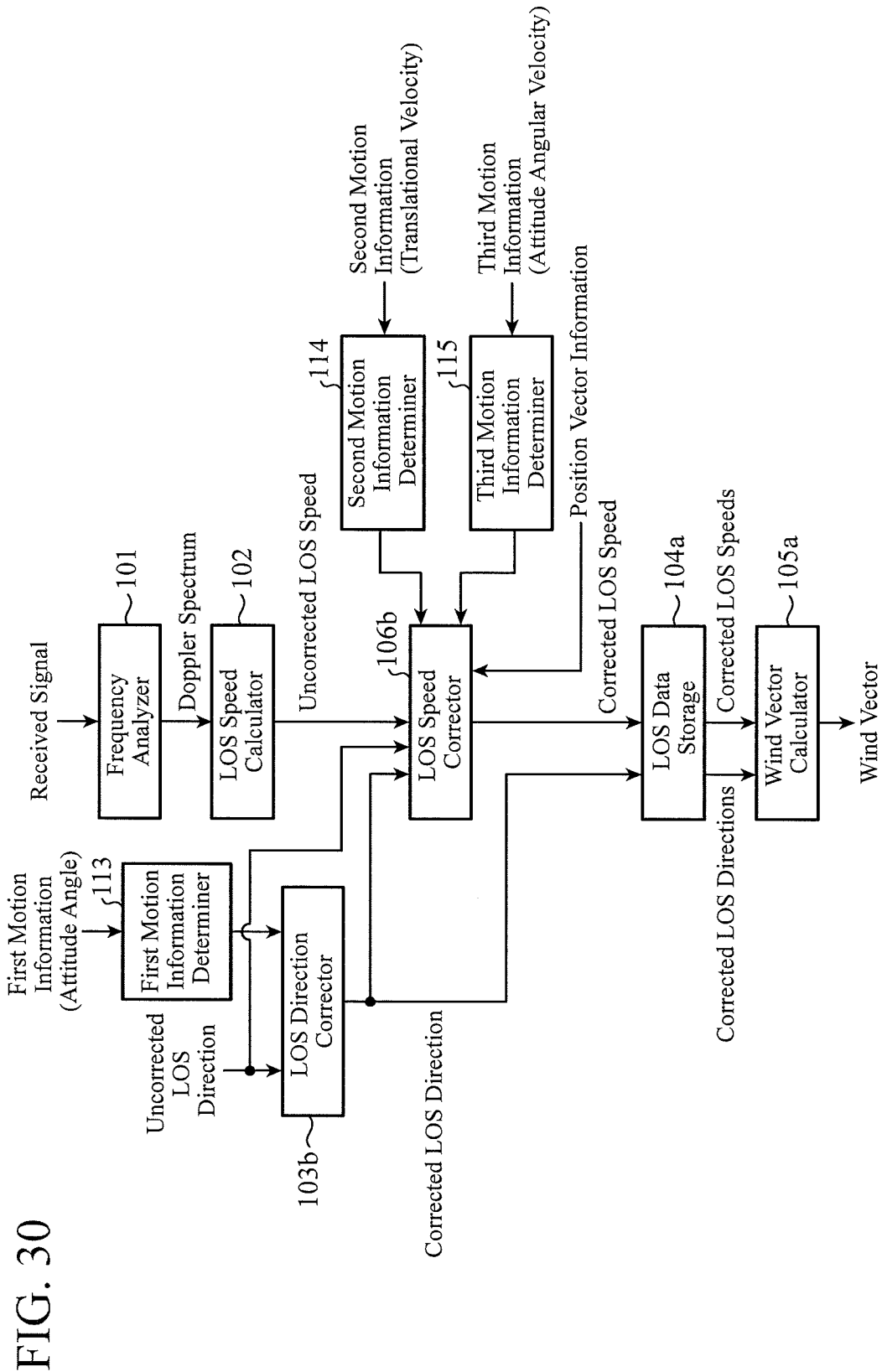
FIG. 30 is a block configuration diagram illustrating functional parts implemented by a signal processing device of Twelfth Embodiment of this disclosure.

FIG. 30 is a block configuration diagram illustrating functional parts implemented by a signal processing device according to Twelfth Embodiment.

A first motion information determiner 113 is a processing part that determines validity of acquired first motion information (attitude angle) and outputs the determination result to a LOS direction corrector 103b. A second motion information determiner 114 is a processing part that determines validity of acquired second motion information (translational velocity) and outputs the determination result to a LOS speed corrector 106b. A third motion information determiner 115 is a processing part that determines validity of acquired third motion information (attitude angular velocity) and outputs the determination result to the LOS speed corrector 106b. Other configurations are the same or similar to those of Third Embodiment illustrated in FIG. 7, and thus, the same symbols are provided to corresponding parts, and descriptions thereof are omitted.

Operations of Twelfth Embodiment are described.

The first motion information determiner 113 performs validity determination on the first motion information (attitude angle) obtained from a motion sensor 10. As a determination method, for example, a method of determining the invalidity of a case where a value of an attitude angle in time series abruptly varies may be used. The LOS direction corrector 103b performs LOS direction correction processing only when it is determined to be valid on the basis of the validity determining information.

Moreover, the second motion information determiner 114 performs validity determination on the second motion information (translational velocity) obtained from the motion sensor. As a determination method, for example, a method of determining the invalidity of a case where a value of the translational velocity in time series abruptly varies may be used. The LOS speed corrector 106b performs LOS speed correction processing related to the translational velocity only when it is determined to be valid on the basis of the validity determining information.

Moreover, the third motion information determiner 115 performs validity determination on the third motion information (attitude angular velocity) obtained from the motion sensor. As a determination method, for example, a method of determining the invalidity of a case where a value of an attitude angular velocity in time series abruptly varies may be used. The LOS speed corrector 106b performs LOS speed correction processing related to the attitude angular velocity only when it is determined to be valid on the basis of the validity determining information.

Figure 31:
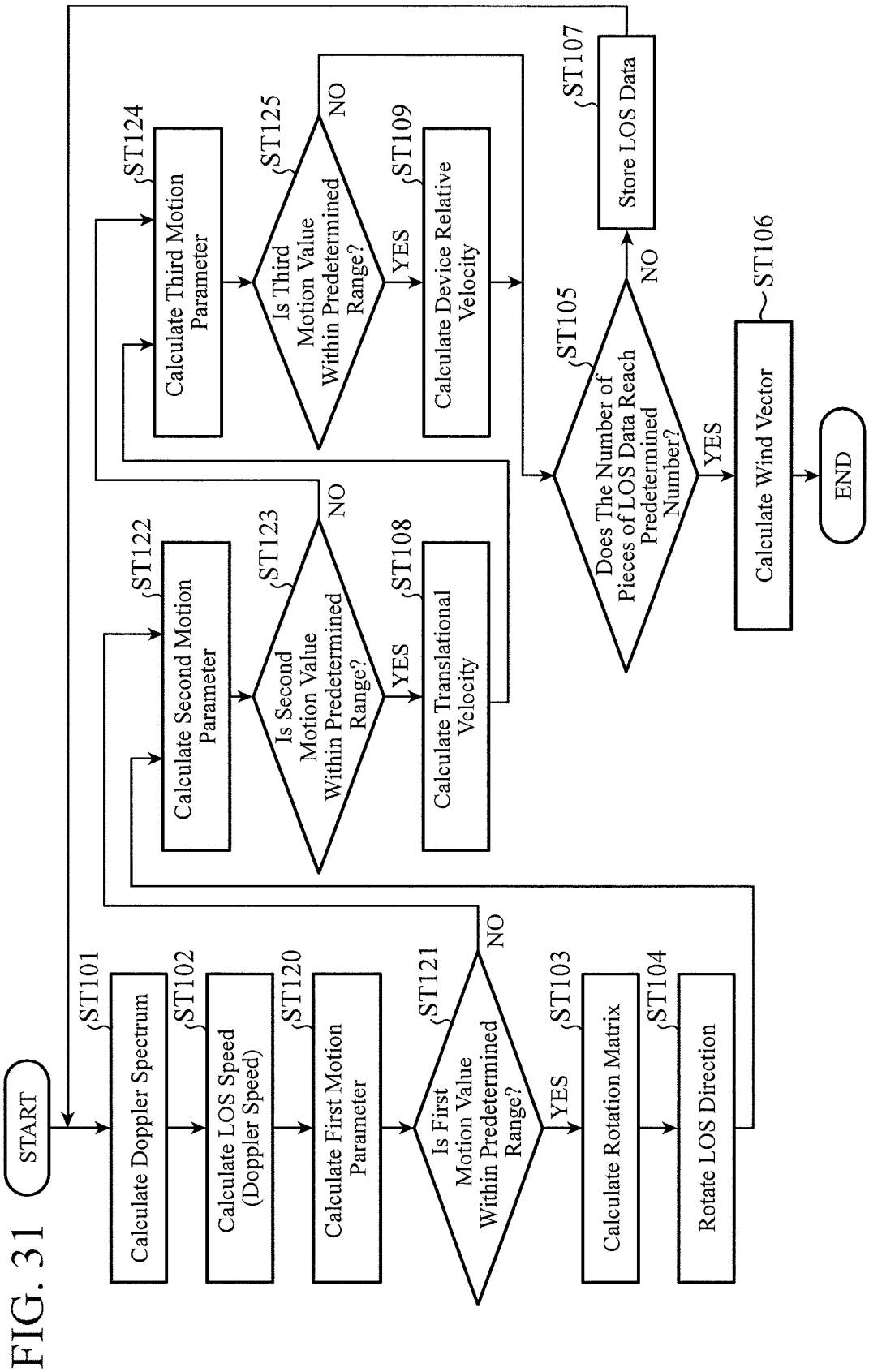
FIG. 31 is a flowchart illustrating operations of a wind measuring apparatus of Twelfth Embodiment of this disclosure.

FIG. 31 illustrates a flowchart of a signal processing part of the wind measuring apparatus according to Twelfth Embodiment. Steps ST101 and ST102 are the same as those in Third Embodiment. In Twelfth Embodiment, the first motion information determiner 113 calculates statistical values such as a time series distribution, an average, or a variance of the first motion information (attitude angle) (step ST120). When the value is within a predetermined range, it is determined to be valid (step ST121). When it is determined to be valid in step ST121, the LOS direction corrector 103b calculates the rotation matrix (step ST103) and rotates the LOS direction (step ST104).

After step ST104 or when it is determined invalid in step ST121, the second motion information determiner 114 calculates statistical values such as a time series distribution, an average, or a variance of the second motion information (translational velocity) (step ST122). When the value is within a predetermined range, it is determined to be valid (step ST123). When it is determined to be valid in step ST123, the LOS speed corrector 106b calculates the translational velocity (step ST108).

After step ST108 or when it is determined invalid in step ST123, the third motion information determiner 115 calculates statistical values such as a time series distribution, an average, or a variance of the third motion information (attitude angular velocity) (step ST124). When the value is within a predetermined range, it is determined to be valid (step ST125). When it is determined to be valid in step ST125, the LOS speed corrector 106b calculates a device relative velocity (step ST109). The subsequent operations in steps ST105 to ST107 are the same as those in Third Embodiment.

In Twelfth Embodiment, validity is determined for each piece of motion information, and thus accuracy deterioration of a wind vector due to degradation of the motion information can be mitigated.

According to the wind measuring apparatus of Twelfth Embodiment, further included are: the first motion information determiner to determine that attitude angle information is valid in a case where the attitude angle information satisfies a predetermined condition; the second motion information determiner to determine that the translational velocity information is valid in a case where the translational velocity information satisfies a predetermined condition; and the third motion information determiner for determining that the attitude angular velocity information is valid in a case where the attitude angular velocity information satisfies a predetermined condition, and the LOS direction corrector performs correction using the attitude angle information determined to be valid by the first motion information determiner. The LOS speed corrector performs correction using the translational velocity information determined to be valid by the second motion information determiner and performs correction using the attitude angular velocity information determined to be valid by the third motion information determiner. This enables suppressing degradation of estimation accuracy of the wind vector.

Thirteenth Embodiment

In Seventh Embodiment, the number of pieces of LOS data is set in accordance with spatial spread of measurement points. Since LOS speed data being out of an intended observation region deteriorates an estimation accuracy of a wind vector and thus can be invalidated before measuring a wind vector, which is described as a thirteenth embodiment.

Figure 32:
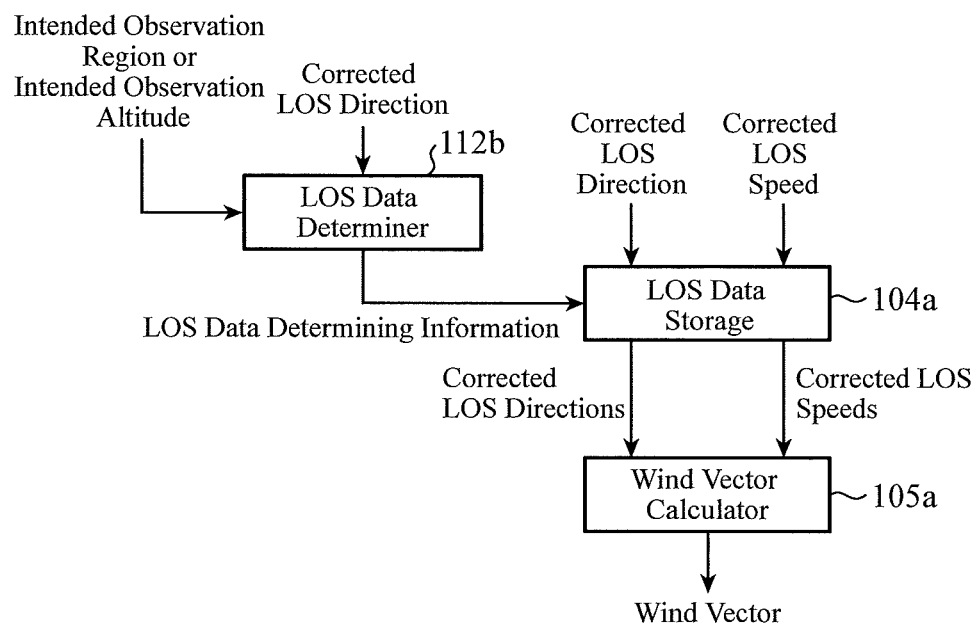
FIG. 32 is a block configuration diagram illustrating the main part of functional parts implemented by a signal processing device according to Thirteenth Embodiment of this disclosure.

FIG. 32 is a block configuration diagram illustrating the main part of functional parts implemented by a signal processing device according to Thirteenth Embodiment.

A LOS data determiner 112b receives both an intended observation region or an intended observation altitude and a corrected LOS direction, performs validity determination of the LOS data, and outputs the result to a LOS data storage 104a.

Operations of Thirteenth Embodiment are described.

The LOS data determiner 112b determines whether a measurement point is within the intended observation region or whether it is at the intended observation altitude using both the intended observation region or intended observation altitude and the corrected LOS direction. When it is determined to be invalid, a signal for discarding the LOS data is output to the LOS data storage 104a.

Figure 33:
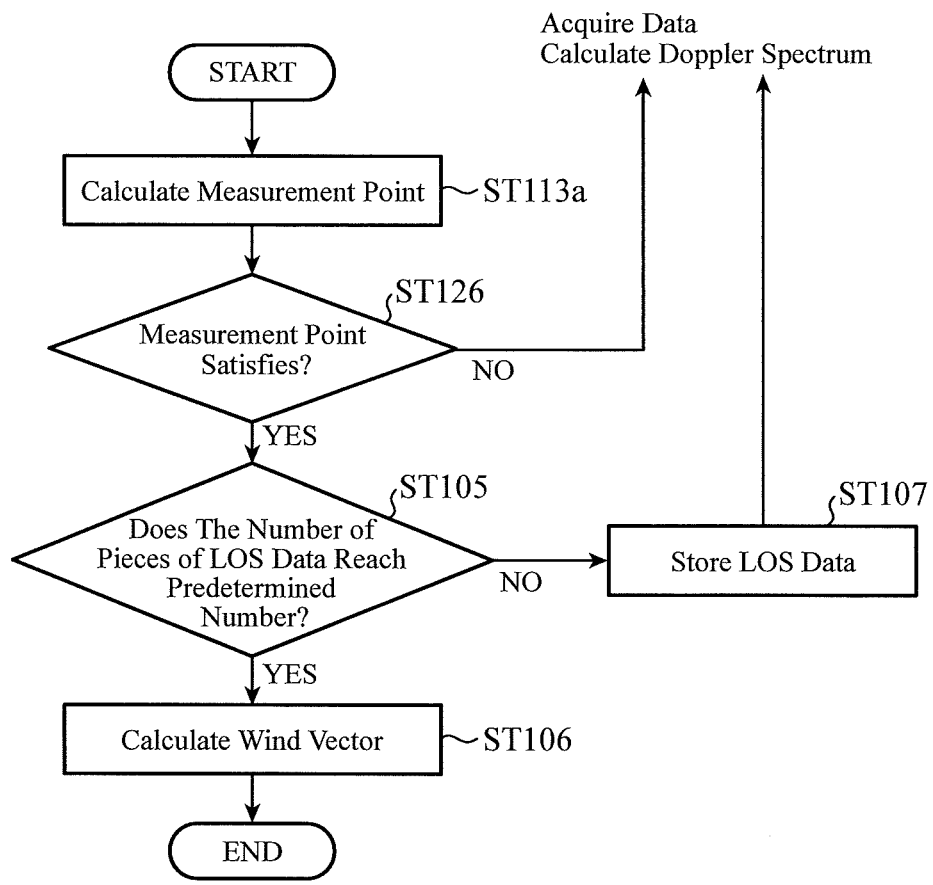
FIG. 33 is a flowchart illustrating operations of a wind measuring apparatus of Thirteenth Embodiment of this disclosure.

FIG. 33 illustrates a flowchart of a signal processing part of the wind measuring apparatus according to Thirteenth Embodiment. In FIG. 33, illustration of parts common to First to Third Embodiments is omitted. That is, after performing any one set of processing of steps ST101 to ST104 of First Embodiment, steps ST101 to ST108 of Second Embodiment, and steps ST101 to ST109 of Third Embodiment, the flow proceeds to step ST113a. In step ST113a, the LOS data determiner 112b calculates a measurement point considering an inclination angle. Next, the LOS data determiner 112b determines whether the measurement point satisfies the intended observation region or the intended observation altitude (step ST126). When it is satisfied, LOS data determining information indicating the validity of the LOS data is output. When the measurement point does not satisfy the intended observation region or the intended observation altitude, LOS data determining information indicating the invalidity of the LOS data is output. The LOS data storage 104a determines whether the number of pieces of valid LOS data among the acquired LOS data reaches a predetermined number on the basis of the LOS data determining information (step ST105) and, when the predetermined number is reached, outputs the predetermined number of valid LOS data. The wind vector calculator 105 calculates a wind vector on the basis of the LOS data acquired from the LOS data storage 104a (step ST106). On the other hand, when the number of pieces of valid LOS data does not reach the predetermined number, the LOS data storage 104a stores the LOS data (step ST107), and the flow returns to the calculation processing of Doppler spectrum, that is, step ST101 in First to Third Embodiments. Moreover, when the measurement point does not satisfy the intended observation region in step ST126, the flow returns to step ST101 of First to Third Embodiments, and the LOS speed is measured again.

In Thirteenth Embodiment, validity determination of the measurement point is performed with respect to the intended observation region and discards invalid data, accuracy deterioration of a wind vector can be mitigated.

According to the wind measuring apparatus of Thirteenth Embodiment, further included is the LOS data determiner to determine that the LOS data is valid in a case where the position of the measurement point at which the wind vector is calculated satisfies a predetermined condition. The wind vector calculator calculates the wind vector using the LOS data determined to be valid. This enables suppressing degradation of estimation accuracy of the wind vector.

Fourteenth Embodiment

In Fourteenth Embodiment, there is provided a case where a shift detection range, which is a range of received signal for which a Doppler frequency shift is obtained, is changed on the basis of the attitude angles of the platform and the attitude angular velocity that is a change in an attitude angle.

Figure 34:
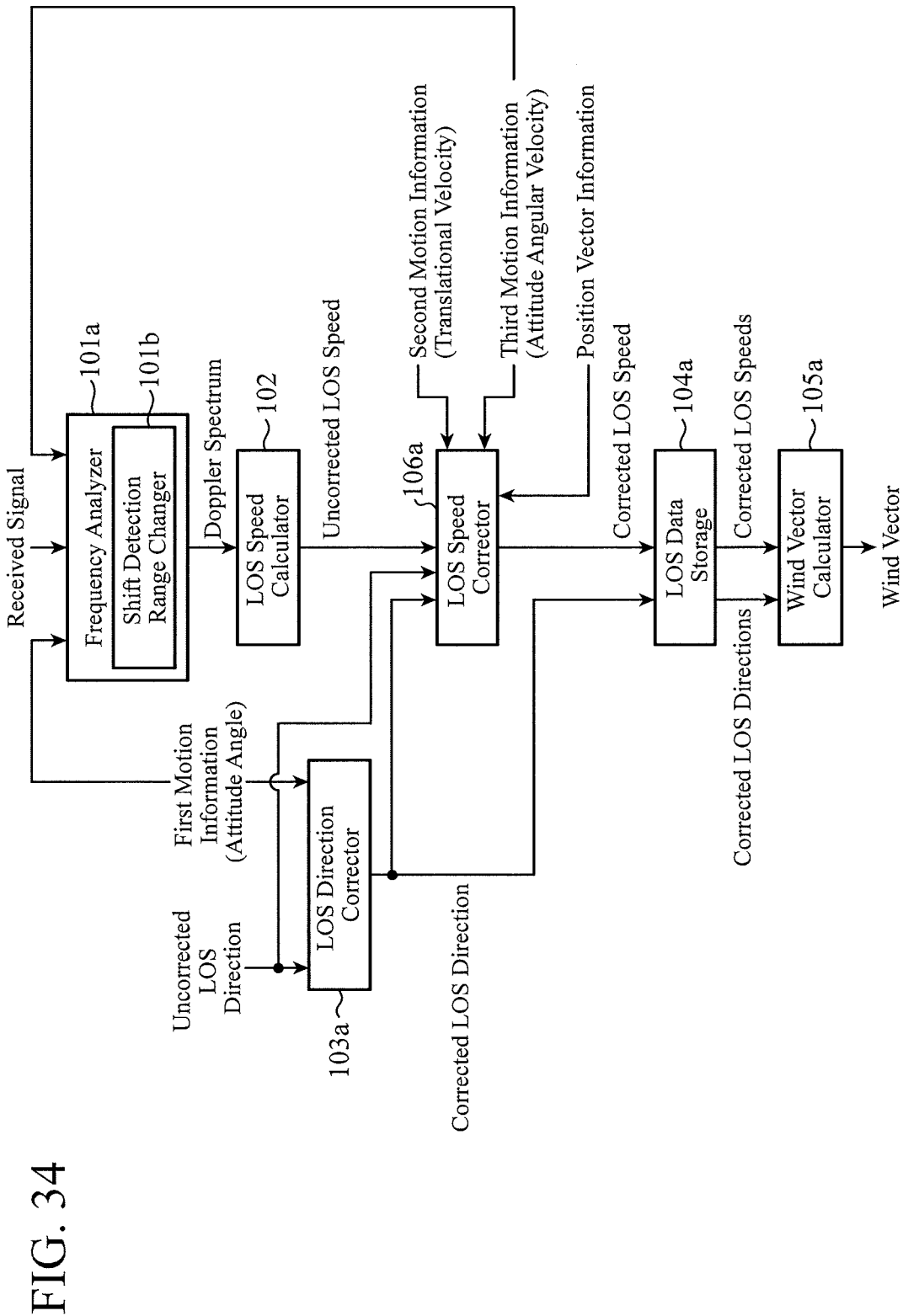
FIG. 34 is a block configuration diagram illustrating functional parts implemented by a signal processing device of Fourteenth Embodiment of this disclosure.

FIG. 34 is a block configuration diagram illustrating functional parts implemented by a signal processing device of Fourteenth Embodiment of the disclosure. Points different from those in FIG. 7 of Third Embodiment are described. Attitude angles being first motion information and the attitude angular velocity being third motion information are input to a frequency analyzer 101a. A shift detection range changer 101b included in the frequency analyzer 101a uses the attitude angles and the attitude angular velocity to predict attitude angles, and changes the shift detection range on the basis of the predicted attitude angles. Specifically, the shift detection range changer 101b smooths angles input in time series for each of roll, pitch, and yaw of the attitude angles using a Kalman filter or the like. The Kalman filter is also used to the angular velocity of each of roll, pitch, and yaw for smoothing. From the smoothed angles and angular velocity, attitude angles of the platform at the time of obtaining the LOS speed at m (1 or more) times later from a current time point are predicted. The number m for determining a future time point for obtaining the predicted attitude angle is appropriately determined considering the time for determining the shift detection range and the time for obtaining information of attitude angles.

A method of determining a shift detection range to be used to obtain a Doppler frequency shift from reflection light after irradiating laser light in a LOS direction is described. Using a rotation matrix T based on predicted attitude angles, the LOS direction with respect to the platform is converted to a predicted LOS direction in a three-dimensional coordinate system that includes as a reference a ground surface or water surface at a predicted inclination angle of the platform. Both the LOS direction and the predicted LOS direction are expressed using an azimuth angle and an altitude angle (elevation angle). The shift detection range is changed on the basis of a change in the altitude angle due to the motion of the platform.

Set an altitude angle to zero degree in the z axis direction. The altitude angle in the LOS direction in a state without motion is denoted by EL, and the altitude angle in the LOS direction at the predicted attitude angle is denoted by $EL_C$. The shift detection range is changed as follows in accordance with an attitude angle to allow the wind velocity at the same altitude to be measured regardless of attitude angle. A distance from an optical antenna device 5 to a point at altitude H is denoted by L when there is no motion, and an attitude angle predicted in a state with motion is denoted by $L_C$. The following relationship holds.

$$H = L*\cos(EL) = L_C*\cos(EL_C) \tag{8}$$

By deforming Expression (8), the following Expressions are obtained.

$$\beta = \cos(EL)/\cos(EL_C) \tag{9}$$

$$L_C = \beta*L \tag{10}$$

Expressions (9) and (10) indicate that, in a case where the LOS direction changes due to the motion, distances about the shift detection range in a state without motion are multiplied by a coefficient β calculated by Expression (9). The coefficient β is referred to as a distance correcting coefficient.

Figure 35:
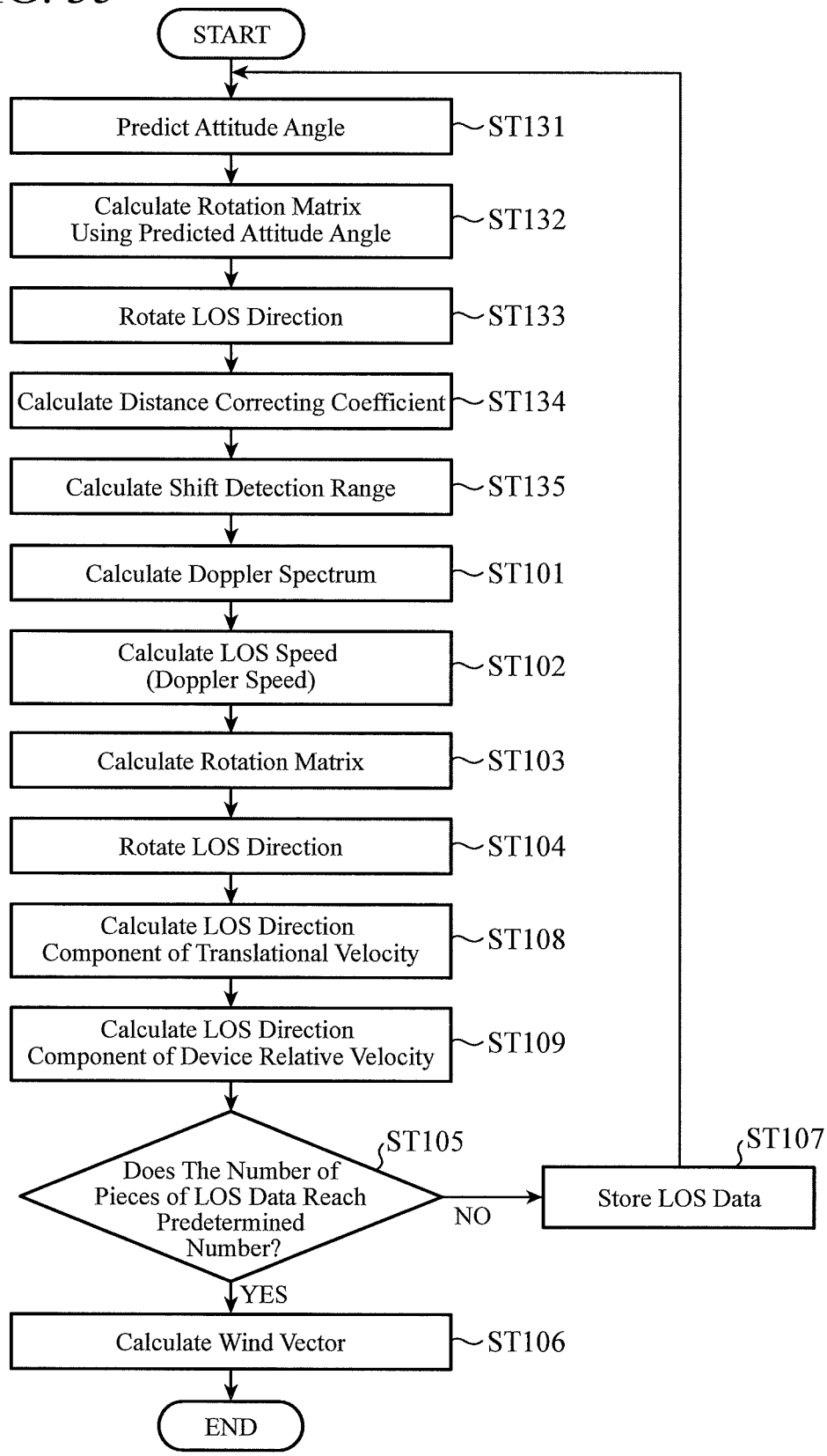
FIG. 35 is a flowchart illustrating operations of a wind measuring apparatus of Fourteenth Embodiment of this disclosure.

FIG. 35 is a flowchart to explain operations of the wind measuring apparatus of Fourteenth Embodiment of the disclosure. In step ST131, the shift detection range changer 101b predicts attitude angles. In step ST132, a rotation matrix is calculated using the predicted attitude angles. In step ST133, the LOS direction is rotated by the rotation matrix. In step ST134, the distance correcting coefficient β is calculated from the predicted LOS direction. In step ST135, a shift detection range is calculated using the distance correcting coefficient β. Thereafter, in step ST101, a Doppler spectrum is calculated from a received signal in the shift detection range. The subsequent operations are the same as those of Third Embodiment. Exactly, processing from step ST131 to ST135 is performed when LOS data m times before is calculated.

Even in a case where the attitude angle varies due to the motion, the LOS speed is obtained using a received signal reflected at the same altitude by changing the shift detection range in accordance with the attitude angle, and thus a wind vector can be calculated more correctly than the conventional method. In the wind measuring apparatus according to the present disclosure, assuming that a premise that the wind velocity is the same at the same altitude holds, laser light is irradiated in a plurality of LOS directions. A shift detection range in which the laser light is reflected at the same altitude when there is no motion is determined for each LOS direction.

In the case of the platform being subjected to motion, the LOS direction changes from the case without motion, and the distance correcting coefficient β becomes a value other than 1 in accordance with Expression (9). In a case where the shift detection range is fixed, a LOS speed at an altitude to be measured is calculated using received signal reflected at a different altitude. In a case where the wind speed varies greatly depending on the altitude, using the LOS speed measured at a different altitude results in obtaining the wind speed of the calculated wind vector different from the actual wind speed.

In Embodiment 14, a change in the LOS direction is predicted and the shift detection range is changed in accordance with the predicted LOS direction, and thus even in the case of the platform being subjected to motion, the LOS speed at measurement points at the same altitude can be measured. Thus, a wind vector can be accurately measured. This can be applied to other Embodiments than Embodiment 3.

In Embodiment 14, in order to predict the LOS direction, both the attitude angles and the angular velocity, which is a change in an attitude angle, detected by the motion sensor 10 are used. Alternatively, the motion sensor 10 may detect only the attitude angles and estimate an angular velocity from time series data of the input attitude angles and predicts attitude angles from the estimated angular velocity. Alternatively, the signal converted by an A/D converter 8 may be stored until the actual attitude angles is obtained, and a Doppler spectrum may be calculated by dividing a shift detection range in accordance with the actual attitude angles. In the case of dividing the shift detection range in accordance with the actual attitude angles, the output of the motion sensor 10 may not be input to the frequency analyzer 101a. The shift detection range may be determined by any method as long as the shift detection range can be determined to cover received signals reflected by particles at an altitude within a predetermined range including an altitude of the measurement point. The shift detection range changer 101b may be a functional part independent of the frequency analyzer 101a.

According to the wind measuring apparatus of Fourteenth Embodiment, the frequency analyzer further includes the shift detection range changer to change the shift detection range, which is a range of the received signal for which Doppler frequency shift is obtained, on the basis of the attitude angle information. This enables suppressing degradation of estimation accuracy of the wind vector.

According to the wind measuring apparatus of Fourteenth Embodiment, the frequency analyzer further includes the shift detection range changer to change the shift detection range, which is a range of the received signal for which Doppler frequency shift is obtained, on the basis of the attitude angle information and the attitude angular velocity information. This enables suppressing degradation of estimation accuracy of the wind vector.

According to the wind measuring apparatus of Fourteenth Embodiment, the frequency analyzer obtains the Doppler frequency shift using a shift detection range, which is a range of the received signal, the range determined such that the received signal is reflected by the particles at an altitude within a predetermined range including an altitude of the measurement point. This enables suppressing degradation of estimation accuracy of the wind vector.

Within the scope of the present disclosure, the present disclosure may include a flexible combination of the respective embodiments, a modification of any component of the respective embodiments, or an omission of any component in the respective embodiments.

INDUSTRIAL APPLICABILITY

As described above, wind measuring apparatuses according to the present disclosure relate to a configuration to measure wind at a remote point in the atmosphere and are suitable for use in devices such as Doppler radars, a wind profilers, Doppler lidars, and a Doppler sodars.

REFERENCE SIGNS LIST 1, 101a: Frequency analyzer, 101b: Shift detection range changer, 102: LOS speed calculator, 103, 103a, 103b: LOS direction corrector, 104, 104a, 104b, 104c: LOS data storage, 105, 105a: Wind vector calculator, 106, 106a, 106b: LOS speed corrector, 107, 107a, 107b, 107c, 107d, 107e: LOS data quantity controller, 108: Motion period analyzer, 109: Measurement point calculator, 110: Predicted LOS speed calculator, 111: Intensity information calculator, 112, 112a, 112b: LOS data determiner, 113: First motion information determiner, 114: Second motion information determiner, 115: Third motion information determiner, 116: Motion accuracy calculator

The invention claimed is:

1. A wind measuring apparatus comprising:
   a signal transmitter/receiver to radiate a radiation signal of an electromagnetic wave or sound wave in a line-of-sight direction into an atmosphere, and to receive a reflection signal being the radiation signal reflected by particles traveling together with the atmosphere;
   a frequency analyzer to obtain a Doppler frequency shift between a received signal and the radiation signal, the received signal being the reflection signal received by the signal transmitter/receiver;
   a line-of-sight speed calculator to obtain a line-of-sight speed from the Doppler frequency shift;
   a motion sensor to detect motion information including attitude angle information being an attitude angle of a support object to which the signal transmitter/receiver is fixed;
   a line-of-sight direction corrector to correct the line-of-sight direction by using the attitude angle information;
   a wind vector calculator to calculate a wind direction and wind speed representing a wind vector of the atmosphere at a measurement point located at a predetermined position with respect to the signal transmitter/receiver by using line-of-sight data including a set of the corrected line-of-sight direction corrected by the line-of-sight direction corrector and the line-of-sight speed; and
   a shift detection range changer to change a shift detection range being a divided range of the received signal in the time-domain used by the frequency analyzer for obtaining the Doppler frequency shift to correspond to a range of the received signal reflected by particles at altitudes within a predetermined range including an altitude of the measurement point, on the basis of the attitude angle information.

2. The wind measuring apparatus according to claim 1, wherein the motion sensor detects translational velocity information being a traveling velocity of the support object,
   the wind measuring apparatus further comprises a line-of-sight speed corrector to correct the line-of-sight speed obtained by the line-of-sight speed calculator by using the translational velocity information, and
   the wind vector calculator calculates the wind vector by using the line-of-sight speed corrected by the line-of-sight speed corrector.

3. The wind measuring apparatus according to claim 1, wherein the motion sensor detects translational velocity information being a traveling velocity of the support object and attitude angular velocity information being a change rate of the attitude angle of the support object,
   the wind measuring apparatus further comprises a line-of-sight speed corrector to correct the line-of-sight speed obtained by the line-of-sight speed calculator by using the translational velocity information and the attitude angular velocity information, and
   the wind vector calculator calculates the wind vector by using the line-of-sight speed corrected by the line-of-sight speed corrector.

4. The wind measuring apparatus according to claim 3, wherein the shift detection range changer changes the shift detection range on the basis of the attitude angle information and the attitude angular velocity information.

5. The wind measuring apparatus according to claim 1,
wherein the motion sensor detects attitude angular velocity information being a change rate of the attitude angle of the support object,
the wind measuring apparatus further comprises a line-of-sight speed corrector to correct the line-of-sight speed obtained by the line-of-sight speed calculator by using the attitude angular velocity information, and
the wind vector calculator calculates the wind vector by using the line-of-sight speed corrected by the line-of-sight speed corrector.

6. The wind measuring apparatus according to claim 5,
wherein the shift detection range changer changes the shift detection range on the basis of the attitude angle information and the attitude angular velocity information.

7. The wind measuring apparatus according to claim 1, wherein the shift detection range changer changes the shift detection range on the basis of predicted attitude angle information.

8. The wind measuring apparatus according to claim 2, wherein the shift detection range changer changes the shift detection range on the basis of predicted attitude angle information.

9. The wind measuring apparatus according to claim 3, wherein the shift detection range changer changes the shift detection range on the basis of predicted attitude angle information.

10. The wind measuring apparatus according to claim 4, wherein the shift detection range changer changes the shift detection range on the basis of predicted attitude angle information.

11. The wind measuring apparatus according to claim 5, wherein the shift detection range changer changes the shift detection range on the basis of predicted attitude angle information.

12. The wind measuring apparatus according to claim 6, wherein the shift detection range changer changes the shift detection range on the basis of predicted attitude angle information.

* * * * *